(12) United States Patent
McCallister

(10) Patent No.: US 8,805,298 B2
(45) Date of Patent: Aug. 12, 2014

(54) TRANSCEIVER WITH COMPENSATION FOR TRANSMIT SIGNAL LEAKAGE AND METHOD THEREFOR

(75) Inventor: Ronald Duane McCallister, Scottsdale, AZ (US)

(73) Assignee: CrestCom, Inc., Scottsdale, AZ (US)

( * ) Notice: Subject to any disclaimer, the term of this patent is extended or adjusted under 35 U.S.C. 154(b) by 1008 days.

(21) Appl. No.: 12/521,412

(22) PCT Filed: Jan. 30, 2007

(86) PCT No.: PCT/US2007/061277
§ 371 (c)(1),
(2), (4) Date: Jun. 26, 2009

(87) PCT Pub. No.: WO2008/094259
PCT Pub. Date: Aug. 7, 2008

(65) Prior Publication Data
US 2010/0048146 A1  Feb. 25, 2010

(51) Int. Cl.
*H04B 1/44* (2006.01)
*H04M 1/00* (2006.01)
*H04B 1/38* (2006.01)
*H04L 5/16* (2006.01)
*H04B 1/52* (2006.01)
*H04B 1/04* (2006.01)

(52) U.S. Cl.
CPC ........ *H04B 1/525* (2013.01); *H04B 2001/0416* (2013.01)
USPC ........................... 455/78; 455/550.1; 375/219

(58) Field of Classification Search
CPC .. H04B 1/525; H04B 17/005; H04B 17/0055; H04B 1/1027; H04B 2001/1045; H04B 24/00
USPC ........... 455/73, 77, 78, 87, 550.1, 114.2, 296; 375/219
See application file for complete search history.

(56) References Cited

U.S. PATENT DOCUMENTS

| | | |
|---|---|---|
| 5,444,864 A | 8/1995 | Smith |
| 5,526,377 A | 6/1996 | Yedid et al. |
| 6,539,204 B1 | 3/2003 | Marsh et al. |
| 2002/0009057 A1 | 1/2002 | Blackwell et al. |
| 2003/0054788 A1* | 3/2003 | Sugar et al. ................... 455/323 |
| 2004/0151238 A1* | 8/2004 | Masenten .................... 375/219 |

(Continued)

OTHER PUBLICATIONS

International Search Report: Application No. PCT/US07/61277, ISA Feb. 26, 2008.

*Primary Examiner* — Andrew Wendell
(74) *Attorney, Agent, or Firm* — Schmeiser, Olsen & Watts LLP; Lowell W. Gresham

(57) ABSTRACT

A transceiver (10) includes an RF transmitter (12) and an RF receiver (14) coupled together through a duplexer (30) or non-filtering multiport device (30'). Either device may leak significant portions (56, 58) of the transmit signal (20) into the receive signal (44), and may significantly distort the transmit signal (20). Distortion is compensated in the transmitter (12) through the use of a linear predistorter (68) that is adjusted in response to an RF feedback signal obtained from the antenna-side of the device. Transmit signal leakage is compensated in the receiver (14) by producing an RF cancellation signal (106) that, when combined with the receive signal (44) at RF at least partially cancels the transmit signal portions (56, 58) leaked into the receive signal (44). Residual leakage signal and intermodulation products thereof may be cancelled digitally.

23 Claims, 9 Drawing Sheets

(56) References Cited

U.S. PATENT DOCUMENTS

| | | |
|---|---|---|
| 2005/0107051 A1 | 5/2005 | Aparin et al. |
| 2005/0163249 A1 | 7/2005 | McCallister |
| 2006/0035601 A1* | 2/2006 | Seo .............................. 455/78 |
| 2006/0135101 A1* | 6/2006 | Binshtok et al. ........... 455/232.1 |
| 2007/0054629 A1* | 3/2007 | Maligeorgos et al. .......... 455/88 |
| 2007/0082617 A1* | 4/2007 | McCallister ................. 455/63.1 |
| 2010/0159837 A1* | 6/2010 | Dent et al. ................... 455/63.1 |
| 2013/0130620 A1* | 5/2013 | Judd et al. ...................... 455/24 |

* cited by examiner

TRANSCEIVER WITH COMPENSATION FOR TRANSMIT SIGNAL LEAKAGE AND METHOD THEREFOR

TECHNICAL FIELD

The present invention relates generally to the field of electronic communications. More specifically, the present invention relates to the field of transceivers, in which a transmitter and a receiver are physically located near one another, and in which the receiver benefits from being isolated from the transmitter.

BACKGROUND ART

When a transmitter and receiver are physically located near one another, the receiver needs to be isolated from the transmitter, particularly when the transmitter and receiver operate simultaneously. Isolation is needed so that the transmitter's transmitted signal does not interfere with the signal the receiver is trying to receive. The isolation may be aided to a great degree by configuring the transmitter and receiver to transmit and receive carrier signals respectively oscillating in non-overlapping frequency bands. But the use of separate transmit and receive bands seldom provides sufficient isolation when the transmitter and receiver share an antenna or use antennas located near one another. When the transmitter and receiver are near one another, the transmit signal is at such a vastly greater amplitude than the receive signal that the transmit signal can overwhelm the receiver.

The transmit signal can overwhelm the receiver in a variety of different ways. First, the transmit signal includes energy in the transmit band. If this transmit-band energy is not vastly attenuated from the receive signal without significantly attenuating the receive-band energy, then the transmit-band energy can exceed the power limits of the input circuits in the receiver. When the power limits are exceeded, regardless of the frequency, the input circuits in the receiver cannot successfully process the receive signal.

In addition, when narrowband interfering signals are near the receive band, any nonlinear processing in the receiver's input circuits, such as amplifiers and/or mixers, causes some degree of cross modulation, which produces intermodulation products in the receive band. When the transmit band energy and/or the nearby narrowband interfering signal energy are relatively high at the front end of the receiver, such receive band intermodulation products can be considerably greater than the energy in the receive signal itself.

Another way that the transmit signal may overwhelm the receiver results because the transmit signal itself often includes a small amount of energy in the receive band. This receive-band energy portion of the transmit signal often results from intermodulation due to nonlinear processing in a high-power amplifier (HPA) at the output section of the transmitter and may also result from linear amplification of out-of-band thermal noise at the HPA input. Desirably, any energy outside the transmit band, including energy falling in the receive band, is held to as low a level as possible. But inevitably, some small residual portion of receive-band energy is nevertheless present in a transmit signal. And, since the transmit signal is at such a vastly greater amplitude than the receive signal, this small residual portion of receive-band energy in the transmit signal might nevertheless exhibit a sufficient amplitude to interfere with the receive signal. Accordingly, adequate isolation has often suggested that the receive-band energy be attenuated from the transmit signal without significantly attenuating the transmit-band energy and that transmit-band energy be attenuated from the receive signal without significantly attenuating the receive-band energy.

It has been a common practice in frequency division duplex (FDD) communication systems to use a duplexer to provide the desired isolation between a transmitter and receiver. In an FDD system, transmission and reception takes place simultaneously, but in different, predetermined frequency bands. A duplexer essentially includes a "transmit" isolation filter for the transmit signal, where the transmit filter is configured to pass transmit-band energy but to attenuate receive-band energy. A duplexer also includes a "receive" isolation filter for the receive signal, where the receive filter is configured to pass receive-band energy but to attenuate transmit-band energy. A duplexer provides an added benefit of allowing the transmitter and receiver to share a common antenna. In particular, the output of the transmit filter and the input of the receive filter share a common port of the duplexer, and this common port couples to a shared antenna.

In order to be useful, the isolation filters, whether or not included in a duplexer, should exhibit low insertion loss. In other words, the transmit filter should minimally attenuate the transmit-band energy it passes, and the receive filter should minimally attenuate the receive-band energy it passes. All other design parameters remaining equal, increased insertion loss directly causes a reduced link margin, leading to a reduced radio range, reduced data communication rates, increased error rates, and/or the like.

Isolation filters should also exhibit flat responses throughout their passbands. In other words, the insertion loss should be constant over the entire passband of the isolation filter, whether for the transmit filter or the receive filter. Any rippling or other inconstancy in this response produces distortion, which again leads to reduced radio range, reduced data communication rates, increased error rates, and/or the like.

Furthermore, isolation filters should provide a narrow transition band. A narrower transition band for the transmit filter causes the transmit filter to more greatly attenuate receive-band energy without further attenuating transmit-band energy. Likewise, a narrower transition band for the receive filter causes the receive filter to more greatly attenuate transmit-band energy without further attenuating receive-band energy. An inadequately narrow transition band has conventionally lead to inadequate isolation and interference with the receive signal.

Unfortunately, improvements in one of these three design criteria (i.e., insertion loss, flat response, and narrow transition band) are usually achieved at the expense of at least one of the other two. Thus, a good duplexer having truly desirable design characteristics is difficult to obtain.

Furthermore, the problems of obtaining a good duplexer are exacerbated as transmitter power increases. As power increases, the ratio of the power of the transmit signal to the receive signal increases, making adequate isolation more difficult to achieve. And, while printed and photolithographic devices, such as surface acoustic wave (SAW) devices and film bulk acoustic resonator (FBAR) devices, may provide good low cost, low power duplexers, such devices are not currently available for transceiver applications with transmit power greater than several watts.

For higher power applications, such as cellular base stations, which may transmit at up to several hundred watts of power, conventional duplexers that adequately balance insertion loss, flat response, and narrow transition band design criteria tend to be complex metallic structures that are complicated to manufacture, and often require individual manual tuning. As a consequence, such duplexers tend to be one of the more expensive components of a transceiver.

In a multichannel time division duplex (TDD) communication system, transmission and reception do not occur simultaneously for any single channel. But multiple TDD channels may be separated only slightly in frequency from one another. Thus, at any instant, one or more channels may be transmitting while an adjacent channel is attempting to receive. And, both transmission and reception occur in every channel. Since every channel supports both transmission and reception, no isolation filtering like that used in a conventional duplexer can be effective to isolate a transmission signal from a reception signal. Accordingly, multichannel TDD communication systems suffer the same isolation problems that FDD communication systems suffer, but they begin to suffer these problems at lower transmission power levels. And, at higher power levels multichannel TDD communication systems have been deemed impractical due to such problems.

Accordingly, a need exists for a transceiver design that uses techniques other than relying on isolation filters or other than relying solely on isolation filters to isolate a transmitter and a receiver. Such a transceiver design may operate in conjunction with isolation filters, but the isolation filters may then be less complicated, smaller, and less expensive than conventional higher power isolation filters and/or duplexers. Alternatively, such a transceiver design may be used in a communication system with smaller transition bands between the transmit and receive bands. Or, such a transceiver design may be used without isolation filters altogether so as to isolate transmitter from receiver in a multichannel TDD communication system.

Prior art transceivers have attempted to implement the cancellation of a transmit signal from a receive signal, but such attempts have been met with limited success. Some such transceivers utilize transmit signals extracted upstream of a duplexer for use as a reference signal with which cancellation is performed. But the version of the transmit signal that interferes with the receive signal is influenced by duplexer distortions. Since such duplexer distortions are not accounted for in the reference signal, the resulting cancellation is less effective than it might be. To be effective, at least a portion of such cancellation should occur at RF frequencies. Unfortunately, prior art transceivers have attempted to control the processing of reference signals used in cancellation exclusively using analog components. But analog components introduce a wide variety of offsets, distortions, and inaccuracies that may be omitted in digital processing. As a result, reference signals are processed inaccurately, limited amounts of cancellation are achieved, and the character of cancellation is unsuitable for wideband transmit and/or receive signals.

DISCLOSURE OF INVENTION

It is an advantage of at least one embodiment of the present invention that an improved transceiver with compensation for transmit signal leakage into a receive signal and method therefor are provided.

Another advantage of at least one embodiment of the present invention is that a transceiver may use a relatively simple and inexpensive duplexer to isolate the receiver portion of the transceiver from the transmitter portion or may omit the use of a duplexer altogether.

Another advantage of at least one embodiment of the present invention is that portions of a transmit signal that leak into a receive signal are cancelled from the receive signal.

Another advantage of at least one embodiment of the present invention is that the transceiver and method are self-calibrating so that they adapt to different duplexer characteristics and to changes in duplexer characteristics over time and temperature.

Another advantage of at least one embodiment of the present invention is that the transceiver and method compensate for transmit signal leakage over a wide receive frequency band.

Another advantage of at least one embodiment of the present invention is that the transceiver and method control the processing of a reference cancellation signal digitally to avoid the inaccuracies of analog processing and to improve cancellation.

These and other advantages are realized in one form by a method of operating an RF transceiver to compensate for leakage of an RF transmit signal into an RF receive signal. The method calls for obtaining an RF cancellation signal derived from the RF transmit signal. The RF cancellation signal is combined with the RF receive signal to form an RF leakage-compensated receive signal. A digitized cancellation signal stream is formed by being derived from the RF transmit signal. The RF leakage-compensated receive signal is downconverted and digitized to form a digitized receive signal stream. And the digitized cancellation signal stream and the digitized receive signal stream are combined to form a digitized leakage-compensated receive signal stream.

BRIEF DESCRIPTION OF DRAWINGS

A more complete understanding of the present invention may be derived by referring to the detailed description and claims when considered in connection with the Figures, wherein like reference numbers refer to similar items throughout the Figures, and:

BEST MODE FOR CARRYING OUT THE INVENTION

Figure 1:
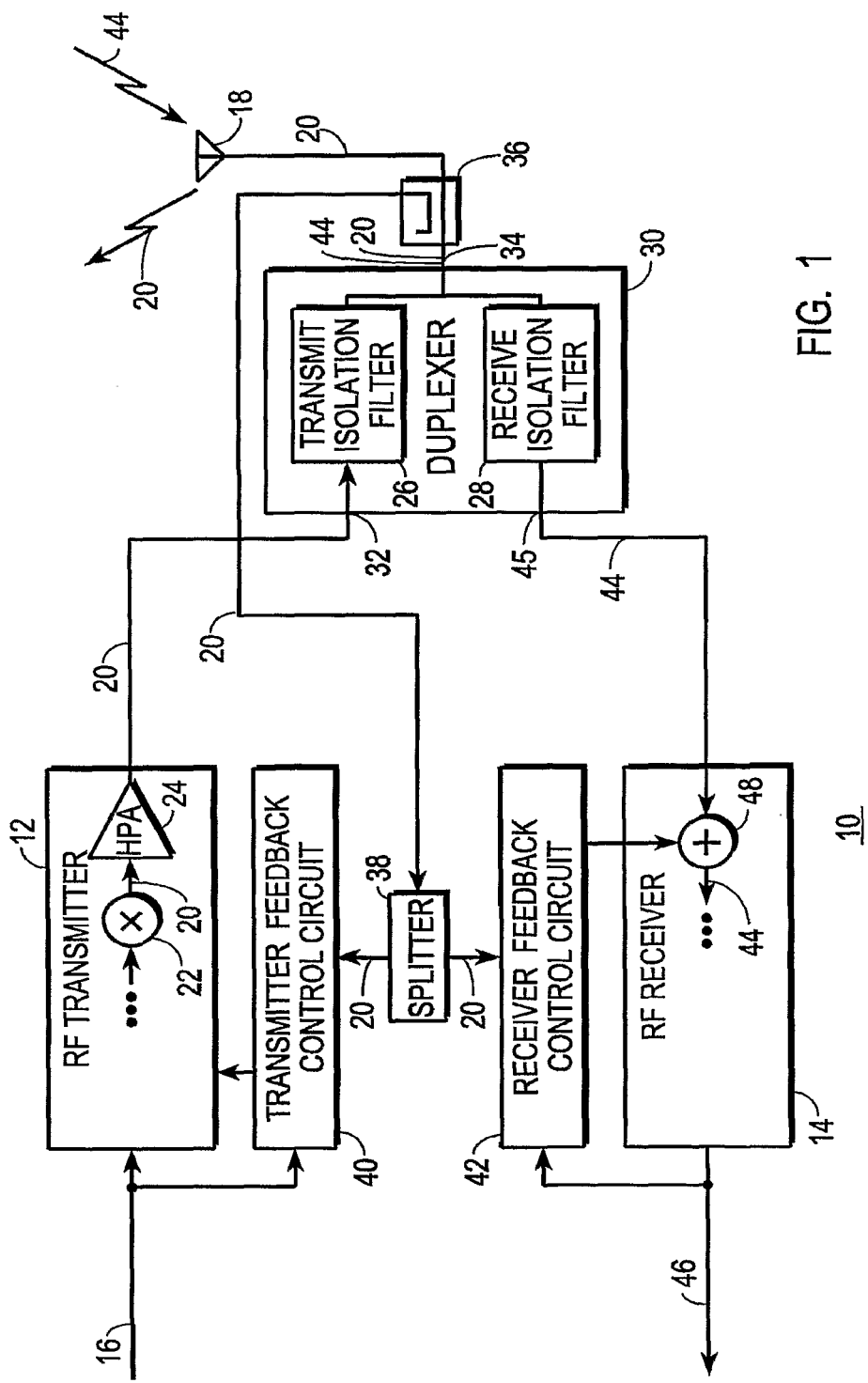
FIG. 1 shows a block diagram of a first example of an RF transceiver configured in accordance with the teaching of the present invention.

FIG. 1 shows a block diagram of a radio-frequency (RF) transceiver 10 configured in accordance with the teaching of the present invention. Transceiver 10 includes an RF transmitter 12 and an RF receiver 14. Transceiver 10 is the type of transceiver that may be used at a cellular telephony cell-site base station, but transceiver 10 may be used in other applications as well, including mobile subscriber equipment (e.g., cell phones, laptops, etc.).

A digitally modulated forward data stream 16 is provided to an input of RF transmitter 12. In a preferred embodiment, forward data stream 16 is a forward communication signal that conveys information and is arranged as a complex data stream having quadrature phase components. Those skilled in the art will appreciate that the complex notation is omitted herein from the figures in order to simplify the presentation of this subject matter. Forward data stream 16 propagates in a forward direction with respect to transmitter 12. In other words, forward data stream 16 propagates in a downstream direction toward an antenna 18 of transceiver 10 from which it is broadcast. Upstream refers to the opposite direction from which a signal, such as forward data stream 16, propagates. For the purposes of this description, forward data stream 16 and all digital data stream variants thereof produced by downstream processing in RF transmitter 12 are referred to as forward data streams to distinguish them from return data streams that are discussed below and which propagate in the opposite direction (i.e., away from antenna 18).

Forward data stream 16 is a digitally modulated data stream. But the type of modulation used to produce forward data stream 16 is not a critical parameter of the present invention. Examples of modulations that may have been used in producing forward data stream 16 include any type of quadrature amplitude modulation (QAM), code-division-multiple-access (CDMA), orthogonal frequency division modulation (OFDM), multiple-input, multiple-output (MIMO) systems, and the like. Forward data stream 16 may be viewed as a wideband data stream and may have resulted from combining a plurality of independently modulated, complex data streams together into a single complex forward data stream 16. The plurality of data streams may correspond to different channels, and the different channels may be configured for a frequency division duplex (FDD) or a multichannel time division duplex (TDD) communication system. In addition, other processing may have been applied to forward data stream 16 upstream of RF transmitter 12. Such other processing may have included pulse shaping filters that are configured to minimize inter-symbol interference (ISI) and peak or crest reduction circuits that reduce the peak-to-average power ratio of forward data stream 16.

RF transmitter 12 generates an RF transmit signal 20 from the forward communication signal provided by forward data stream 16. Forward data stream 16 is translated into RF transmit signal 20 at an upconversion section 22 of RF transmitter 12. For the purposes of this description, RF transmit signal 20 and all RF signal variants thereof produced by downstream processing in transceiver 10 are referred to as RF transmit signal 20 to distinguish them from an RF receive signal that is discussed below. Thus, RF transmit signal 20 is processed through a high-power amplifier (HPA) 24 and, for the embodiment depicted in FIG. 1, then routed to a transmit isolation filter 26.

In the embodiment depicted in FIG. 1, transmit isolation filter 26 and a receive isolation filter 28 are provided by a duplexer 30. The use of duplexer 30 is advantageous in a FDD communication system where one or more channels are dedicated to transmission, one or more channels are dedicated to reception, and no channels are used to both transmit and receive. In such situations, filtering may be used to help isolate receiver 14 from transmitter 12.

An input of transmit isolation filter 26 serves as a transmitter port 32 for duplexer 30 and couples to an output of RF transmitter 12. Within duplexer 30, an output of transmit isolation filter 26 couples to an input of receive isolation filter 28 and serves as an antenna port 34 of duplexer 30. Antenna port 34 of duplexer 30 couples to an input port of a directional coupler 36, and an output port of directional coupler 36 couples to antenna 18. Thus, RF transmit signal 20 passes through duplexer 30 at transmit isolation filter 26, through directional coupler 36, and to antenna 18 where it is broadcast from transceiver 10 with the intention of being received by some remotely located transceiver or receiver.

A portion, and preferably a very small portion, of RF transmit signal 20 is extracted at a coupled port of directional coupler 36 and routed to a splitter 38, where it is then routed to control inputs of a transmitter feedback control circuit 40 and a receiver feedback control circuit 42. Another input of transmitter feedback control circuit 40 is adapted to receive forward data stream 16, and one or more outputs of transmitter feedback control circuit 40 are supplied to RF transmitter 12. Transmitter feedback control circuit 40 is configured to control predistortion applied to forward data stream 16 in RF transmitter 12 to compensate for distortion imparted to RF transmit signal 20 in transmit isolation filter 26 and in analog transmitter components of RF transmitter 12. Transmitter feedback control circuit 40 and the predistortion applied in RF transmitter 12 are discussed in more detail below in connection with FIG. 8.

An RF receive signal 44 is received at antenna 18. In the preferred embodiments, RF receive signal 44 may be received at antenna 18 simultaneously with the broadcasting of RF transmit signal 20 from antenna 18. For the purposes of this description, RF receive signal 44 and all RF signal variants thereof produced in transceiver 10 subsequent to reception at antenna 18 are referred to as RF receive signal 44 to distinguish them from RF transmit signal 20. RF receive signal 44 passes through directional coupler 36 in a reverse direction. But due to the directionality of directional coupler 36, no more than an insignificant portion of RF receive signal 44 is leaked at the coupled port of directional coupler 36. After passing through directional coupler 36 in a reverse direction, in the embodiment depicted in FIG. 1 RF receive signal 44 is applied at antenna port 34 of duplexer 30 and at an input of receive isolation filter 28. Those skilled in the art will appreciate that receive isolation filter 28 thus receives a composite of RF transmit signal 20 and RF receive signal 44. An output of receive isolation filter 28 couples to an input of RF receiver 14 and serves as a receiver port 45 for duplexer 30. To the maximum extent practical, receive isolation filter 28 blocks RF transmit signal 20 but passes RF receive signal 44. But as is discussed below in more detail, a portion of RF transmit signal 20 will also be leaked at the output of receive isolation filter 28.

RF receiver 14 processes RF receive signal 44 by down-converting and digitizing. The output of RF receiver 14 is a modulated digital data stream 46, which may be routed from RF receiver 14 through a bandpass filter, a bank of bandpass filters, a subband tuner, or the like, to a digital demodulator and decoder (not shown). Digital data stream 46 is also routed to a control input of receiver feedback control circuit 42. And, an output of receiver feedback control circuit 42 couples to an analog RF combiner 48 within RF receiver 14. At analog RF combiner 48 the leaked portion of RF transmit signal 20 is cancelled from RF receive signal 44 in response to processing performed in receive feedback control circuit 42. In particular, receiver feedback control circuit 42 is configured to compensate RF receiver 14 for the leaked portion of RF transmit signal 20 in response to RF transmit signal 20 obtained through directional coupler 36 and splitter 38 and in response to digital data stream 46. Receiver feedback control circuit 42 and the compensation of RF receiver 14 are discussed below in more detail in connection with FIGS. 10-12.

Figure 2:
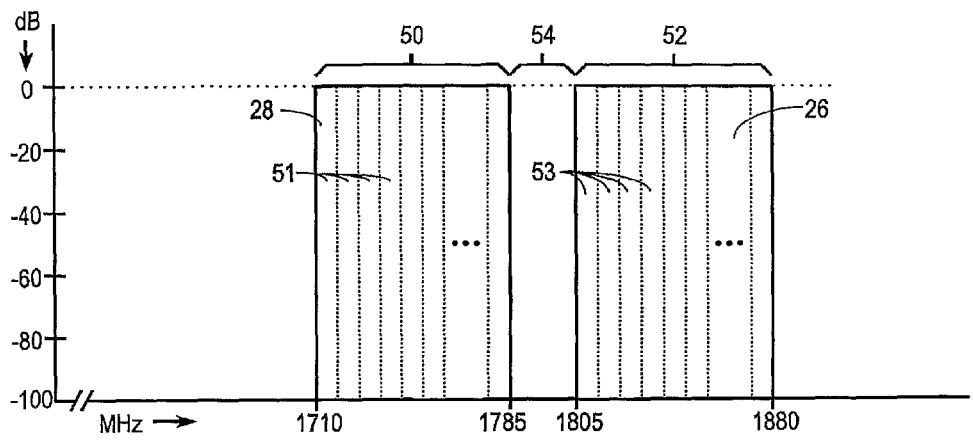
FIGS. 2-4 respectively show spectral transfer functions for ideal, complex, and simple duplexers, any one of which may be used in the RF transceiver of FIG. 1.
Figure 3:
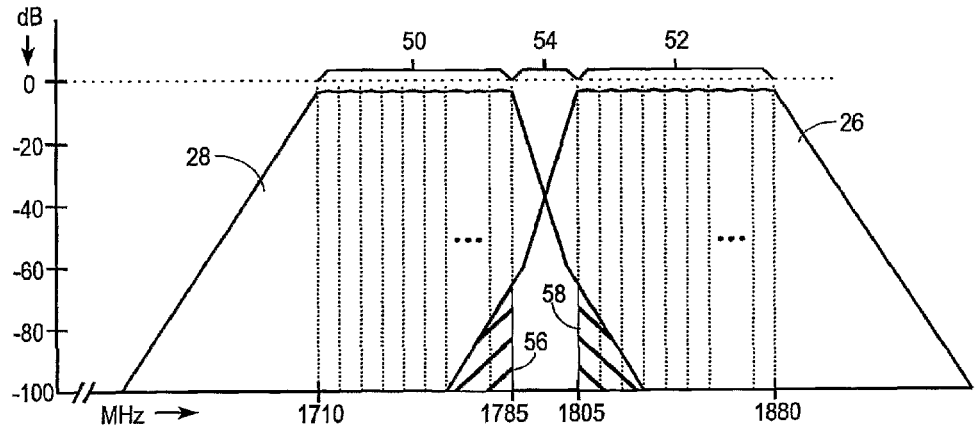
Figure 4:
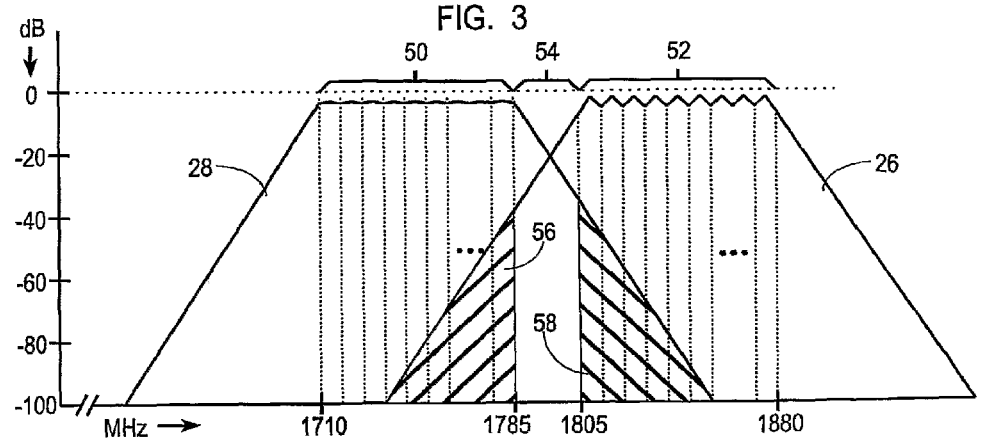

FIGS. 2-4 respectively show spectral transfer functions for ideal, complex, and simple duplexers, any one of which may serve as duplexer 30 (FIG. 1) within transceiver 10. The transfer functions are shown as spectral diagrams forming plots of attenuation versus frequency. Those skilled in the art will appreciate that the transfer functions provide a detailed characterization of transmit isolation filter 26 (FIG. 1) and of receive isolation filter 28 (FIG. 1). While FIGS. 2-4 indicate specific amounts of attenuation and specific frequency ranges, those skilled in the art will appreciate that these specifics are examples only and are provided to aid an understanding of the present invention, not to serve as any limitation whatsoever.

Of course, the ideal transfer function schematically depicted in FIG. 2 is impractical, if not impossible, to achieve using real-world components. But the ideal duplexer transfer function of FIG. 2 is presented here for comparison purposes with a complex duplexer transfer function (FIG. 3) and a simple duplexer transfer function (FIG. 4). Referring to FIGS. 1 and 2, a receive frequency band 50 is shown positioned in the spectrum where the spectral content of RF receive signal 44 is primarily concentrated. Likewise, a transmit frequency band 52 is positioned in the spectrum where the spectral content of RF transmit signal 20 is primarily concentrated. A number of vertical lines are depicted within receive frequency band 50 and within transmit frequency band 52 to indicate that a number of discrete FDD channels 51 and 53 may be simultaneously conveyed in each band. Transmit frequency band 52 is separated from receive frequency band 50 with no overlap between the two. In fact, a transition-frequency band 54 is positioned in the spectrum between receive frequency band 50 and transmit frequency band 52. A communication system within which transceiver 10 operates does not use transition-frequency band 54 for the communication of information. Rather, transition-frequency band 54 is provided to help in isolating RF transmit signal 20 from RF receive signal 44.

The ideal transfer functions of FIG. 2 depict ideal states for three characteristics of transmit isolation filter 26 and of receive isolation filter 28. First, the ideal transfer functions cause no insertion loss. In other words, within each frequency band of interest the respective RF transmit and RF receive signals are not attenuated, as indicated by the tops of the transfer functions being at 0 dB in FIG. 2. Second, the ideal transfer functions provide a flat response. Thus, throughout each frequency band of interest, the attenuation or gain remains constant, shown at a constant 0 dB in FIG. 2. And, third, the ideal transfer functions provide for vertical transition bands, as indicated by the vertical walls at the lowest and highest frequencies in each frequency band.

The version of RF transmit signal 20 processed by duplexer 30 is an extremely high power signal relative to RF receive signal 44. Since cellular systems manage the receive signal power level to maintain a fixed low level, only slightly higher than the ambient thermal noise power level of the receiver, the higher the average power level of the RF transmit signal 20 generated by HPA 24, the greater the difference between the two RF signals. The spectral content of RF transmit signal 20 is primarily concentrated in transmit frequency band 52, but not entirely. Nonlinear distortion imposed on RF transmit signal 20 within RF transmitter 12, and typically within HPA 24, causes intermodulation, which expands the spectrum occupied by RF transmit signal 20 beyond transmit frequency band 52. And, linear amplification of out-of-band thermal noise within HPA 24 also contributes. Desirably, any energy in RF transmit signal 20 outside of transmit frequency band 52 is held to as low a level as possible. But some small amount of energy outside of transmit frequency band 52 will inevitably be included in RF transmit signal 20, and some of this energy will fall in receive frequency band 50. Since RF transmit signal 20 exhibits such an extremely high power level relative to RF receive signal 44, even an extremely small fraction of receive frequency band 50 energy within RF transmit signal 20 at the output of transmit isolation filter 26 can potentially interfere with RF receive signal 44.

But the ideal transmit isolation filter 26 depicted by FIG. 2 entirely blocks all energy outside of transmit frequency band 52, including all energy falling within receive frequency band 50. All out-of-band energy is blocked due to the vertical transition band characteristic of the ideal transmit isolation filter 26. Thus, no receive frequency band 50 energy passes through transmit isolation filter 26 in RF transmit signal 20, where it would most likely interfere with RF receive signal 44. On the other hand, all transmit frequency band 52 energy included in RF transmit signal 20 passes through the ideal transmit isolation filter 26 due to the no insertion loss characteristic. And, the transmit frequency band 52 energy is passed without distortion due to the flat response characteristic.

For the ideal transfer functions depicted by FIG. 2, an extremely high power, RF transmit signal 20 having energy perfectly confined to transmit frequency band 52 is provided in combination with an extremely weak, RF receive signal 44 at the input to receive isolation filter 28. The spectral content of RF receive signal 44 is primarily concentrated in receive frequency band 50. The ideal receive isolation filter 28 then entirely blocks all transmit band 52 energy from this combination signal, but passes all receive band 50 energy. Since the receive frequency band 50 energy has been removed from RF transmit signal 20 by transmit isolation filter 26, only RF receive signal 44, and more precisely only so much of RF receive signal 44 as actually falls in receive frequency band 50, passes to the output of receive isolation filter 28. The ideal transition band of receive isolation filter 28 is responsible for blocking the transmit frequency band 52 energy. And, the no-insertion-loss and flat-response characteristics of receive isolation filter 28 cause RF receive signal 44 to pass through receive isolation filter 28 without any attenuation or distortion. Accordingly, transmit isolation filter 26 and receive isolation filter 28 work together to isolate RF receiver 14 from RF transmitter 12.

FIG. 3 schematically depicts transfer functions for a practical but complex duplexer 30. Referring to FIGS. 1-3, compared to the ideal transfer functions of FIG. 2, the complex transmit and receive isolation filters 26 and 28 associated with FIG. 3 apply small amounts of insertion loss to the RF signals they respectively process. FIG. 3 depicts these small insertion losses by illustrating the tops of the transfer functions being slightly below 0 dB. Desirably any insertion loss is held to a minimum. Moreover, compared to the ideal transfer functions of FIG. 2, the complex transmit and receive isolation filters 26 and 28 of FIG. 3 insert small amounts of distortion into the RF signals they respectively process. FIG. 3 depicts these small amounts of distortion by illustrating the tops of the transfer functions as being just slightly rippled. Desirably, any rippling is held to a minimum. And, compared to the ideal transfer functions of FIG. 2, the complex transmit and receive isolation filters 26 and 28 of FIG. 3 have narrow but not vertical transition bands. The narrow, but not vertical, transition bands permit some small amount of energy outside the respective receive frequency band 50 and transmit frequency band 52 to pass through receive isolation filter 28 and transmit isolation filter 26.

The narrow, but not vertical, transition bands more greatly attenuate out-of-band energy the further that energy is in frequency away from the filter's passband. As indicated by an $R_x$ leakage component 56, receive-band energy in RF transmit signal 20 will be greatly attenuated at the output of transmit isolation filter 26 compared to at the input of transmit isolation filter 26. But receive-band energy will nevertheless be present in some small amount in RF transmit signal 20 at the input of receive isolation filter 28, particularly in that portion of receive frequency band 50 that resides closest to transmit frequency band 52. And, this receive-band energy of $R_x$ leakage component 56 will not be further attenuated to any significant degree in receive isolation filter 28.

Likewise, as indicated by a $T_x$ leakage component 58, transmit-band energy will be greatly attenuated at the output of receive isolation filter 28 compared to at the input of receive isolation filter 28. But transmit-band energy will nevertheless be present to some degree with RF receive signal 44 at the output of receive isolation filter 28, particularly in that portion of transmit frequency band 52 that resides closest to receive frequency band 50.

The complex duplexer 30 described by the transfer functions of FIG. 3 may be implemented in a manner understood by those skilled in the art by forming each of transmit isolation filter 26 and receive isolation filter 28 to be a band pass filter, a band pass filter cascaded with a band reject filter, or the like. At higher power levels, this is conventionally implemented using a metallic, tuned-cavity duplexer having numerous resonant cavities. A complex, large, expensive, and heavy structure results. Moreover, such duplexers are often manually tuned to optimize their performance. Accordingly, due to the materials involved, the processing of those materials, and the manual labor involved in assembling and optimizing, such duplexers tend to be prohibitively expensive for many RF communications applications.

FIG. 4 schematically depicts transfer functions for a practical but simple duplexer 30. Those skilled in the art will appreciate that the FIG. 4 duplexer is simple only in comparison to the ideal and complex duplexers of FIGS. 2 and 3. This simple duplexer may be less expensive, may weigh less, and be smaller than the complex duplexer depicted in FIG. 3. Referring to FIGS. 1-4, compared to the complex-duplexer transfer functions of FIG. 3, the simple transmit and receive isolation filters 26 and 28 of FIG. 4 apply small amounts of insertion loss to the RF signals they respectively process. FIG. 4, depicts these small insertion losses by illustrating the tops of the transfer functions being slightly below 0 dB. Desirably any insertion loss is held to a minimum.

But compared to the transfer functions for the complex duplexer 30 of FIG. 3, the simple transmit isolation filter 26 of FIG. 4 may insert a greater amount of distortion into RF transmit signal 20 than the complex transmit isolation filter of FIG. 3. A greater amount of distortion may be inserted due to the use of predistortion in RF transmitter 12 and of a transmitter feedback control circuit 40 to control that predistortion. Predistortion is applied upstream of transmit isolation filter 26 so as to compensate for the distortion that transmit isolation filter 26 inserts as well as other distortions that are applied in other portions of RF transmitter 12. Desirably, any distortion inserted into RF receive signal 44 by receive isolation filter 28 is approximately the same as that inserted in the more complex duplexer depicted by the transfer functions of FIG. 3. In other words, it is as low as is reasonably practical.

Moreover, the transition bands for transmit isolation filter 26 and for receive isolation filter 28 in the simple duplexer 30 of FIG. 4 may be relaxed or wider than those for the more complex duplexer 30 depicted by the transfer functions of FIG. 3. A consequence of the relaxed transition bands is that $R_x$ leakage component 56 and $T_x$ leakage component 58 are greater than for the more complex duplexer of FIG. 3. The greater $R_x$ and $T_x$ leakage components 56 and 58 may be tolerated in transceiver 10 because these leakage signals are compensated within RF receiver 14 through the use of cancellation techniques. The cancellation process is controlled through the use of a feedback loop controlled by receiver feedback control circuit 42.

In some communication systems, such as multichannel TDD systems, the use of a duplexer is inappropriate. Since each channel in a multichannel TDD system is used both to transmit and receive, no frequency difference exists between transmit and receive channels with which to isolate one from the other using isolation filters. Consequently an approach different from that discussed above in connection with FIGS. 1-3 is indicated.

Figure 5:
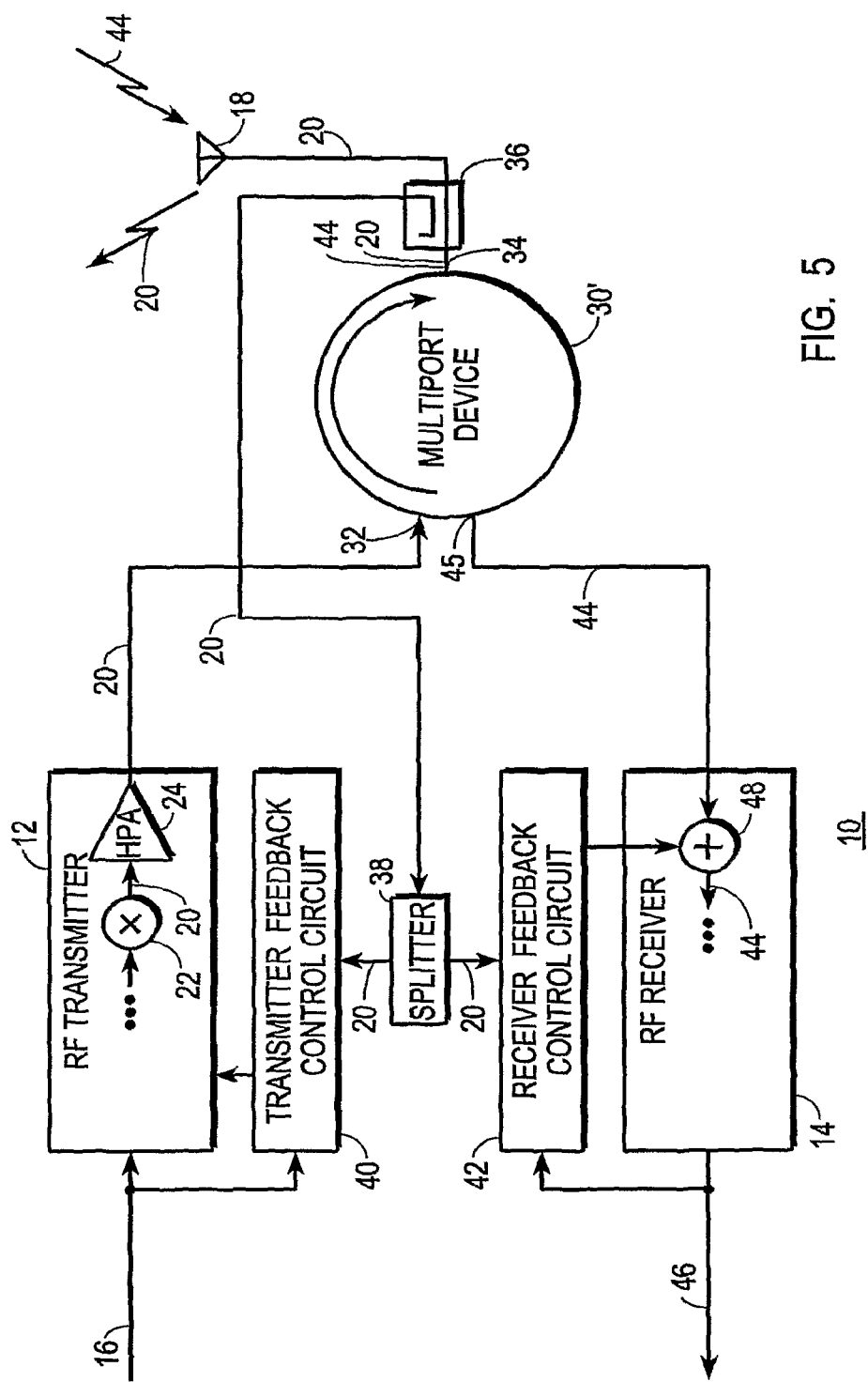
FIG. 5 shows a block diagram of a second example of an RF transceiver configured in accordance with the teaching of the present invention.

FIG. 5 shows a block diagram of a second example of RF transceiver 10. The FIG. 5 example is similar to the FIG. 1 example discussed above, but duplexer 30 from the FIG. 1 example is replaced by a different type of multiport device, depicted as a circulator 30' in FIG. 5. The FIG. 5 example is more appropriate for use in a multichannel TDD communication system. Energy entering multiport device 30' is transmitted to the next adjacent terminal in a specific direction without being significantly filtered. Thus, RF transmit signal 20 entering multiport device 30' at transmitter port 32 is transmitted to antenna port 34 without significant filtering, and RF receive signal 44 entering multiport device 30' at antenna port 34 is transmitted to receiver port 45 without significant filtering. Any impedance mismatch downstream of multiport device 30' results in reflections of RF transmit signal 20, which are likewise transmitted to receiver port 45, and a certain amount of leakage of RF transmit signal 20 at receiver port 45 also occurs.

Figure 6:
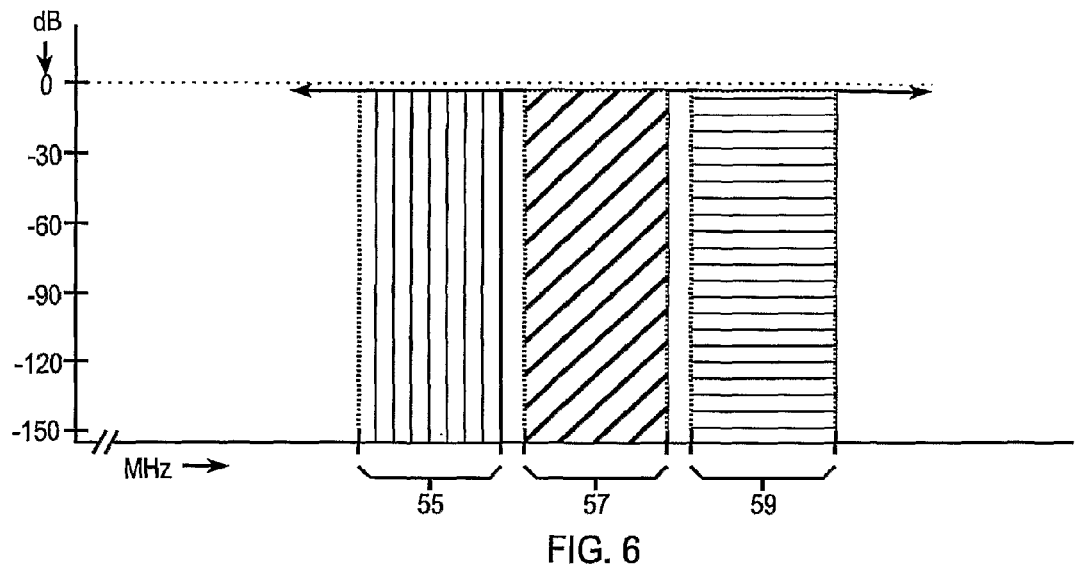
FIG. 6 shows a spectral transfer function for a multiport device which may be used in the RF transceiver of FIG. 5.

FIG. 6 graphically shows a spectral transfer function which describes the operation of multiport device 30'. In particular, FIG. 6 depicts a section of spectrum that has been allocated to three different TDD channels 55, 57, and 59. FIG. 6 indicates that no appreciable filtering is applied by multiport device 30', at least in the region of the spectrum where TDD channels 55, 57, and 59 have been allocated. FIG. 6 also shows that that insertion loss and distortion are low.

Referring back to FIG. 5, directional coupler 36 is depicted arranged substantially as shown in the FIG. 1 example. But those skilled in the art will appreciate that multiport device 30' could alternatively be configured so that a small amount of RF transmit signal 20 is extracted in a directional fashion that tends to exclude energy propagating in the reverse direction. In addition, since the distortion applied by multiport device 30' is low, directional coupler 30' may alternatively be located upstream of multiport device 30'.

Figure 7:
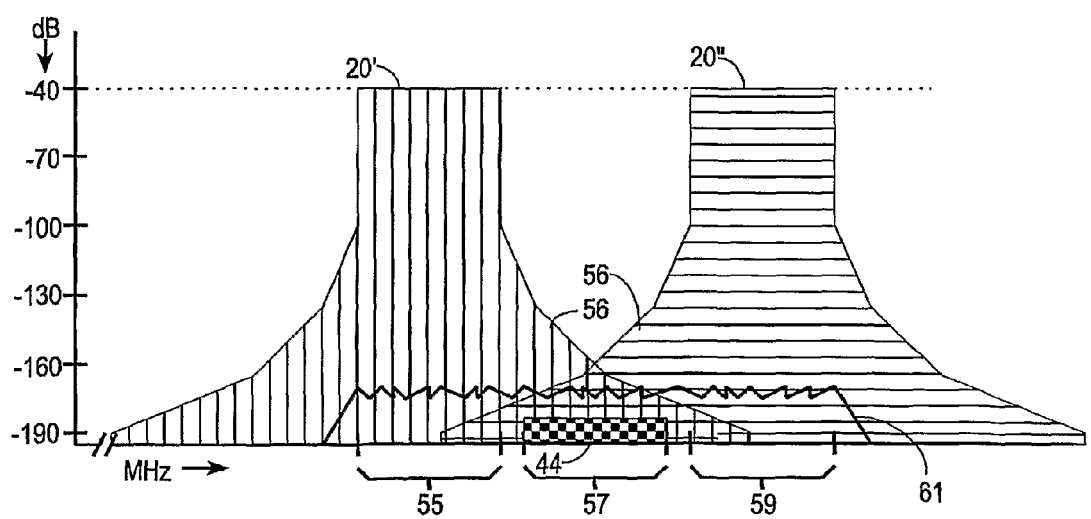
FIG. 7 shows a spectral plot representative of transmitting from channels adjacent to a channel attempting to receive in a multichannel time division duplex (TDD) communication signal.

FIG. 7 shows a spectral plot depicting a transmission in TDD channels 55 and 59, which are spectrally located adjacent to TDD channel 57. The FIG. 7 spectral plot represents the composite RF signal that may appear at receive port 45 of multiport device 30'. FIG. 7 also shows a reception in TDD channel 57 at the same instant that TDD channels 55 and 59 are transmitting. Those skilled in the art will appreciate that this is but one scenario, that at any instant in a multichannel TDD communication system any channel may be either transmitting or receiving, and that any number of channels may be active.

FIG. 7 graphically indicates that RF transmit signal 20 spectrally covers the entirety of TDD channels 55, 57, and 59. RF transmit signal 20 includes an RF transmit sub-signal 20' primarily, but not entirely, concentrated in channel 55 in combination with an RF transmit sub-signal 20" primarily, but not entirely, concentrated in TDD channel 59. Compared to the energy in TDD channels 55 and 59, only a small portion of RF transmit signal 20, corresponding to $R_x$ leakage components 56, resides in TDD channel 57. But due to the vastly greater signal strength of RF transmit signal 20 when compared to the signal strength of RF receive signal 44, $R_x$ leakage components 56 are likely to be greater than RF receive signal 44.

In addition, FIG. 7 shows that thermal noise 61 amplified by HPA 24 is present throughout TDD channels 55, 57, 59. While also only a small portion of RF transmit signal 20, it is highly significant when compared the signal strength of RF receive signal 44. A goal of a cancellation process discussed below is to cancel the portions of RF transmit signal 20, including $R_x$ leakage components 56 and thermal noise 61, that otherwise prevent the successful reception of RF receive signal 44. This goal is pursued regardless of whether transceiver 10 is being employed in an FDD or multichannel TDD communication system.

Figure 8:
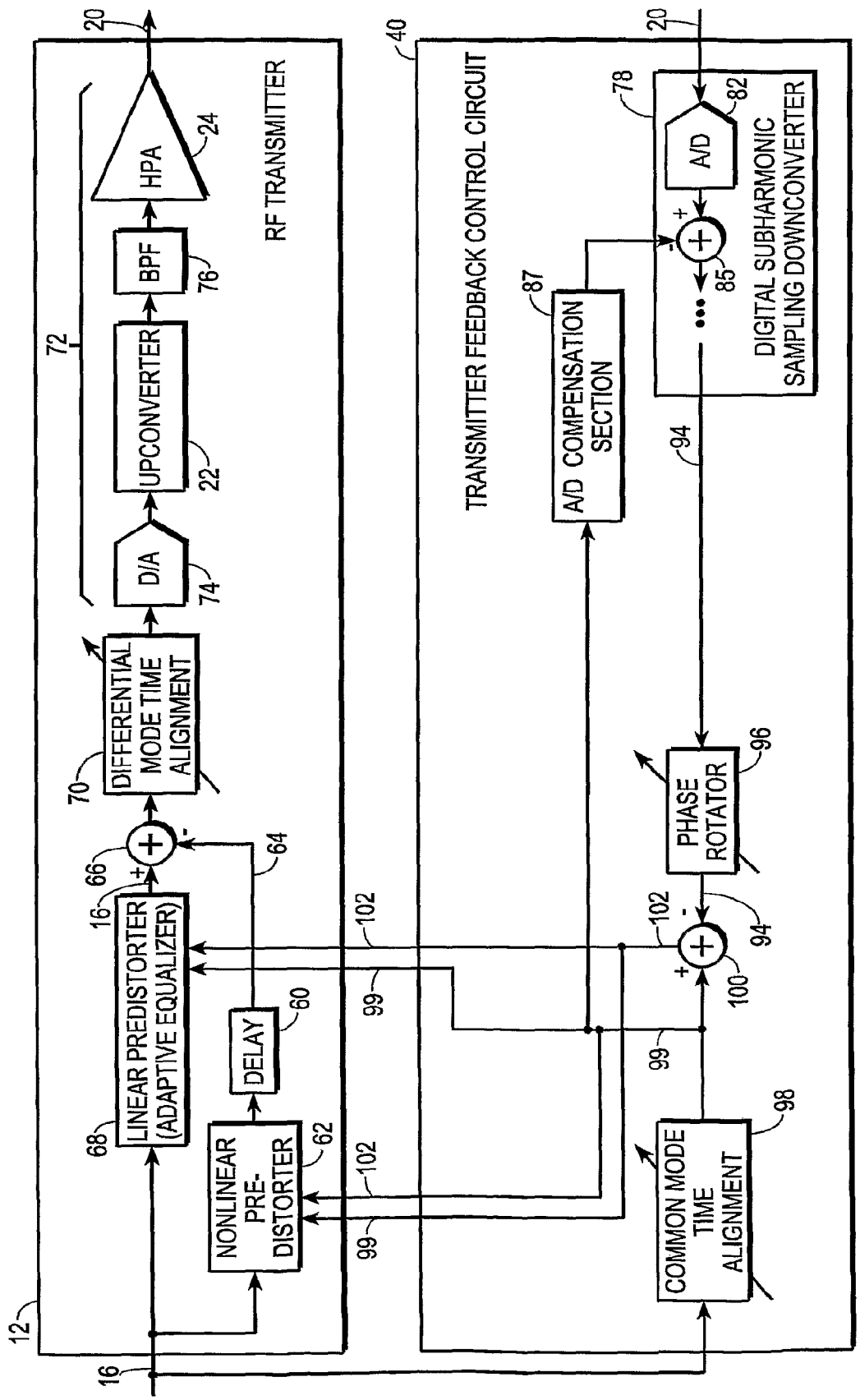
FIG. 8 shows a block diagram of an RF transmitter and a transmitter feedback control circuit from the RF transceiver of FIGS. 1 and 5.

FIG. 8 shows a block diagram of RF transmitter 12 and of transmitter feedback control circuit 40. RF transmitter 12 is adapted to receive forward data stream 16 at baseband and to predistort forward data stream 16 to compensate for distortions introduced downstream of the predistortion in transmit isolation filter 26 (FIG. 1), multiport device 30' (FIG. 5), and/or in other analog transmitter components. The nature of the predistortion is controlled by transmitter feedback control circuit 40. Then, RF transmitter 12 converts the predistorted forward data stream 16 into RF transmit signal 20 in preparation for being broadcast from antenna 18 (FIGS. 1 and 5).

Forward data stream 16 is received at a linear predistorter 68 and a nonlinear predistorter 62 within RF transmitter 12. Nonlinear predistorter 62 desirably generates a plurality of higher-order basis functions in response to forward data stream 16. The basis functions are functionally related to forward data stream 16 in a nonlinear way. In one example, one basis function is roughly equal to I*M(I), and another basis function is roughly equal to I*M(I)*M(I), where "I" represents the input signal (e.g., forward data stream 16) and "M(I)" represents the magnitude of the input signal. Desirably, the basis functions are as orthogonal to each other as is reasonably possible. Nonlinear predistorter 62 desirably equalizes the basis functions through independent adaptive equalizers (not shown), then combines the equalized basis functions into a forward data stream error signal 64. Forward data stream error signal 64 is delayed through a delay element 60, then applied to a first input of a combination circuit 66 to insert "inverse" nonlinear distortion into forward data stream 16. The amount and form of inverse nonlinear distortion applied at combination circuit 66 is configured to be the inverse of the nonlinear distortions RF transmit signal 20 will encounter downstream so that the downstream distortions will cancel the inverse distortion applied at combination circuit 66, resulting in less distortion in the broadcast version of RF transmit signal 20 than would result without the operation at combination circuit 66.

The adaptive equalizers in nonlinear predistorter 62 desirably adapt equalizer coefficients in response to LMS based estimation-and-convergence algorithms. In other words, the adaptive equalizers desirably estimate equalizer coefficient values that will influence the amount of nonlinear distortion (e.g., distortion outside of transmit frequency band 52 depicted in FIGS. 2-4 or channels 55, 57, and 59 depicted in FIGS. 6-7) in RF transmit signal 20, then alter the coefficients over time in accordance with an LMS algorithm to achieve decreasing amounts of nonlinear distortion until convergence is reached at a minimum amount of nonlinear distortion. The estimation-and-convergence algorithms are based upon feedback obtained from RF transmit signal 20 and controlled by transmitter feedback control circuit 40.

Linear predistorter 68 uses an adaptive equalizer in a preferred embodiment to apply a linear predistortion transformation function to forward data stream 16. As with nonlinear predistorter 62, linear predistorter 68 desirably adjusts equalizer coefficients in response to an LMS based estimation-and-convergence algorithm. The adaptive equalizer of linear predistorter 68 desirably estimates equalizer coefficient values that will influence the amount of linear distortion (e.g., distortion within transmit frequency band 52 depicted in FIGS. 2-4, or channels 55, 57, and 59 depicted in FIGS. 6-7) in RF transmit signal 20, then alters these coefficients over time to adjust the predistortion transformation function applied by the adaptive equalizer and to achieve decreasing amounts of linear distortion until convergence is reached at a minimum amount of linear distortion. The estimation-and-convergence algorithm trains linear predistorter 68 to reduce linear distortion in response to feedback obtained from RF transmit signal 20 and is controlled by transmitter feedback control circuit 40.

After predistortion in linear predistorter 68, the linearly predistorted version of forward data stream 16 is applied to a second input of combination circuit 66. Although not shown, the data rate of forward data stream 16 may be stepped up to match the greater data rate of forward data stream error signal 64 prior to application at combination circuit 66. Forward data stream error signal 64 exhibits a greater data rate to support the higher bandwidth needed to adequately convey the higher-order basis functions generated in nonlinear predistorter 62. Delay element 60 is configured to temporally align forward data stream error signal 64 with the predistorted version of forward data stream 16 when these signals arrive at combination circuit 66.

After combination circuit 66, forward data stream 16 passes through a variable, differential-mode, time alignment section 70. Differential time alignment refers to relative delay inserted into one of the in-phase and quadrature-phase legs of the complex forward data stream 16. Section 70 may be implemented using a fixed delay of less than one clock interval in one of the legs of forward data stream 16 and an interpolator in the other.

After differential timing adjustment in section 70, forward data stream 16 passes to analog transmitter components 72. Analog transmitter components 72 include separate digital-to-analog (D/A) converters 74 for each leg of the complex forward data stream 16. D/A's 74 convert forward data stream 16 from digital to analog signals. Subsequent processing of the forward data stream 16 will now be analog processing and subject to the inaccuracies characteristic of analog processing. For example, the two different D/A's 74 may not exhibit precisely the same gain and may introduce slightly different amounts of delay. Such differences in gain and delay can lead to linear distortion in RF transmit signal 20. Moreover, so long as the different legs of the complex signal are processed separately in different analog components, the components are likely to apply slightly different frequency responses so that linear distortion is worsened by the introduction of frequency-dependent gain and phase imbalances. And, the frequency-dependent gain and phase imbalances worsen as the bandwidth of the communication signal widens.

The two complex legs of the analog signal pass from D/A's 74 to two low-pass filters (not shown), which can be the source of additional linear distortion by applying slightly different gains and phase shifts in addition to slightly different frequency-dependent characteristics. Then, the two complex legs pass to upconverter 22. Upconverter 22 mixes the two complex legs with a local-oscillator signal (not shown) in a manner known to those skilled in the art. Additional linear distortion in the form of gain and phase imbalance may be introduced, and local-oscillator leakage may produce an unwanted DC offset. In addition, upconverter 22 combines the two distinct legs of the complex signal and passes the combined signal, now referred to as RF transmit signal 20, to a band-pass filter (BPF) 76.

BPF 76 is configured to block unwanted sidebands in RF transmit signal 20, but will also introduce additional distortion. RF transmit signal 20 then passes from BPF 76 to HPA 24. HPA 24 is likely to be the source of a variety of linear and nonlinear distortions introduced into RF transmit signal 20. In accordance with a Wiener-Hammerstein RF-amplifier model, HPA 24 acts like an input band-pass filter, followed by a memoryless nonlinearity, which is followed by an output band-pass filter. The memoryless nonlinearity generates an output signal that may be a higher-order complex polynomial function of its input. Each of input and output bandpass filters may introduce linear distortion, but probably little significant nonlinear distortion. On the other hand, the memoryless nonlinearity is a significant source of nonlinear distortion.

For the FDD example of transceiver 10 depicted in FIG. 1, RF transmit signal 20 then passes from HPA 24 and from RF transmitter 12 to transmit isolation filter 26. But due to the analog processing of analog transmitter components 72, RF transmit signal 20 is already corrupted with various linear and nonlinear distortions. As discussed above, RF transmit signal 20 is then further corrupted, primarily by linear distortion introduced into RF transmit signal 20 in transmit isolation filter 26 as discussed above in connection with FIG. 3-4. For the TDD example of transceiver 10 depicted in FIG. 5, RF transmit signal 20 then passes from HPA 24 and from RF transmitter 12 through multiport device 30' where it is likely to receive some further corruption, but less than occurs in the FDD example.

Transceiver 10 uses feedback obtained from RF transmit signal 20 after being distorted in transmit isolation filter 26 (FIG. 1) or multiport device 30' (FIG. 5) to control the linear and nonlinear predistortions applied to forward data stream 16 so as to minimize the distortions. In particular, this RF transmit signal 20 is routed to transmitter feedback control circuit 40 through splitter 38 (FIGS. 1 and 5) from directional coupler 36 (FIGS. 1 and 5).

Within transmitter feedback control circuit 40, RF transmit signal 20 is routed to an input of a digital subharmonic sampling downconverter 78. Desirably, RF transmit signal 20 is routed as directly as possible to downconverter 78 without being processed through analog components that will introduce a significant amount of linear or nonlinear distortion. Such distortions could be mistakenly interpreted by transmitter feedback control circuit 40 and by linear and nonlinear predistorters 68 and 62 as being introduced while propagating toward antenna 18 and compensated. Thus, reverse path distortions might possibly have the effect of causing predistorters 62 and 68 to insert distortion that will have no distortion-compensating effect on the actual RF transmit signal 20 broadcast from antenna 18 and will actually contribute to an increase in distortion.

Figure 9:
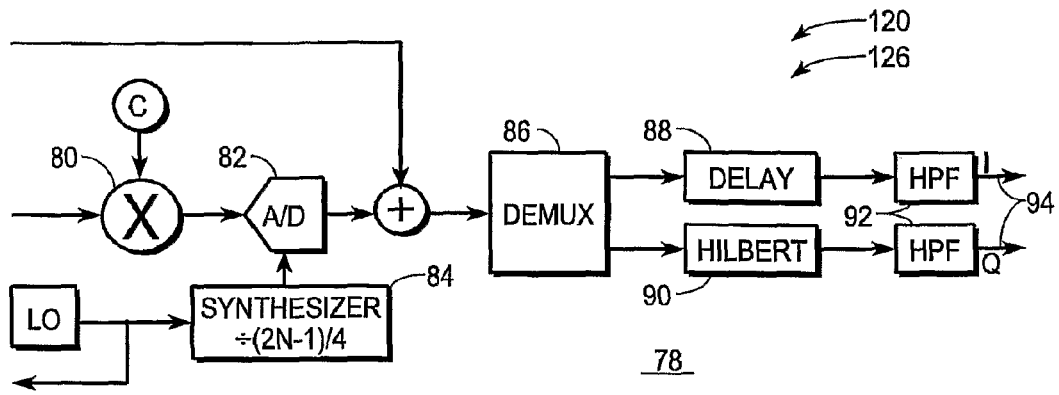
FIG. 9 shows a block diagram of an exemplary digital subharmonic sampling downconverter which may be used in the RF transceiver of FIGS. 1 and 5.

FIG. 9 shows a block diagram of an exemplary digital subharmonic sampling downconverter 78 suitable for use in transmitter feedback control circuit 40 and elsewhere within transceiver 10. Referring to FIGS. 8 and 9, downconverter 78 routes RF transmit signal 20 to a programmable analog attenuator 80. Control inputs of attenuator 80 determine the amount of attenuation provided by attenuator 80 and are provided by a programmable controller (C). Attenuator 80 desirably attenuates the signal level of the reverse-propagating RF transmit signal 20 to compensate for the gain inserted into the forward-propagating version of RF transmit signal 20 and attenuation provided by directional coupler 36.

An output of attenuator 80 couples to an input of an analog-to-digital converter (A/D) 82. Desirably, the same local oscillator signal used by upconverter 22 passes to a synthesizer 84. Synthesizer 84 is desirably configured to multiply the local-oscillator frequency by four and divide the resulting product by an odd number, characterized as 2N±1, where N is a positive integer chosen to satisfy the Nyquist criteria for the bandwidth being downconverted, and is usually greater than or equal to ten. Since compensation for nonlinear distortion is contemplated, this bandwidth may be significantly wider than transmit frequency band 52 (FIGS. 2-4) or the combined band of channels 55, 57, and 59 (FIGS. 6-7) so as to capture energy from far outside of these bands. As a result, A/D 82 performs a direct downconversion through subharmonic sampling.

The direct-subharmonic-sampling-downconversion process performed by A/D 82 suggests that A/D 82 be capable of high-speed conversions. In addition, the subharmonic sampling process tends to sum thermal noise from several harmonics of the baseband into the resulting baseband signal, thereby increasing noise over other types of downconversion. While these factors pose serious problems in many applications, they are no great burden here because only low resolution is required. Moreover, the low resolution demanded of A/D 82 likewise places no particular burden on the phase-noise in the clock signal generated by synthesizer 84 or aperture-jitter characteristic of A/D 82. The low resolution requirement is permitted due to the operation of the above-discussed estimation-and-convergence algorithms that result in an averaging effect which reduces the impact of noise, phase jitter, and/or aperture jitter. Such estimation-and-convergence algorithms are used to translate increased arithmetic processing time into a reduced effective-error level for a return-data stream generated by downconverter 78. Thus, the low resolution is effectively increased by processing a multiplicity of samples before decisions are made based on feedback signals, and no single sample or even small or medium size groups of samples have a significant influence by themselves on decisions made based on the feedback signals. High-quantization error and high-thermal-noise error pose no particular problem.

A/D 82 provides a digital-data stream, and subsequent processing will not be subject to analog inaccuracies. That digital-data stream characterizes the complex feedback signal as a combination signal in which the I and Q legs are combined together. Subsequent processing is performed to appropriately position the subharmonic of interest at baseband and to separate the I and Q legs of the complex signal. Although processing is subsequently performed independently on the I and Q legs of the complex signal, such processing is performed digitally, so no linear distortion is introduced due to quadrature imbalances and/or diverse frequency-dependent gain and phase characteristics.

In particular, the digital-data stream output from A/D 82 is routed through an optional combining circuit 85 to a demultiplexer (DEMUX) 86. Optional combining circuit 85 combines this digital-data stream with a linearizing signal obtained from an A/D compensation section 87 to improve the linearity of A/D 82, if necessary. While A/D 82 need not provide high resolution or low jitter characteristics, a high degree of linearity is desirable because any reduction in linearity might possibly be misinterpreted as being introduced into the forwardly-propagating RF transmit signal 20 and mistakenly compensated for in predistorter 68. To the extent that A/D 82 fails to exhibit sufficient linearity, the linearizing signal may be used to compensate for nonlinearity in A/D 82.

Demultiplexer 86 separates the data stream from A/D 82 into even-and-odd sample data streams. One of these even-and-odd sample data streams is merely delayed in a delay element 88, while the other is transformed in a Hilbert transformation section 90. Outputs from element 88 and section 90 are filtered in high-pass filters (HPF's) 92 to remove DC, where they then collectively serve as a complex return data stream 94. Of course, the rates of the data streams slow as they propagate through downconverter 78, and clock signals are appropriately divided down (not shown) to support the decreasing data rates. In one embodiment high-pass filters 92 may be matched by other high-pass filters (not shown) having substantially the same spectral characteristics but positioned where forward data stream 16 is input to transmitter feedback control circuit 40 so that HPF's 92 insert no unwanted spectral bias.

FIG. 9 depicts one form of a complex digital subharmonic sampling downconverter suitable for use as downconverter 78. But those skilled in the art can devise other forms of direct-digital-subsampling downconversion that will also be acceptable. While direct downconversion is desirable because it does not introduce different analog inaccuracies into the I and Q legs which can lead to linear distortion or other analog inaccuracies that can lead to nonlinear distortion, in higher-frequency applications (e.g., greater than 2.5 GHz) downconversion may be performed in two stages, with the first stage being an analog downconversion. In this situation distortion introduced by the first analog downconversion stage will be less significant because it will be applied over a significantly narrower bandwidth as a percentage of the carrier frequency.

Referring back to FIG. 8, complex return data stream 94 passes from downconverter 78 to a variable phase rotator 96. Variable phase rotator 96 is adjusted to alter the phase of complex return data stream 94 primarily to compensate for the phase rotation introduced by BPF 76 in RF transmitter 12.

Forward data stream 16 is also routed to a control input of transmitter feedback control circuit 40. In particular, forward data stream 16 passes to a variable common mode time alignment section 98. Common mode time alignment refers to delay that is inserted equally into both of the in-phase and quadrature-phase legs of the complex forward data stream 16. Section 98 delays forward data stream 16 at the output of section 98 to form a delayed forward data stream 99 that is in temporal alignment with return data stream 94 at the output of phase rotator 96. At these locations delayed forward data stream 99 is combined in a combiner 100 with return data stream 94 to form an error stream 102. Desirably, differential mode time alignment section 70, phase rotator 96, and common mode time alignment section 98 are all adjusted so that the correlation between delayed forward data stream 99 and return data stream 94 output from phase rotator 96 is maximized.

It is delayed forward data stream 99 that drives optional A/D compensation section 87. And, delayed forward data stream 99 and error stream 102 together control nonlinear predistorter 62 and linear predistorter 68 within RF transmitter 12. In particular, the adaptive equalizers included in nonlinear predistorter 62 adapt their equalizer coefficients in response to a lengthy integration of the correlation between delayed forward data stream 99 and error stream 102. Equalizer coefficients are adjusted to minimize the integrated correlation between these streams.

Likewise, the adaptive equalizer of linear predistorter 68 adapts its equalizer coefficients in response to a lengthy integration of the correlation between delayed forward data stream 99 and error stream 102. Equalizer coefficients are adjusted to minimize the integrated correlation between these streams.

Figure 10:
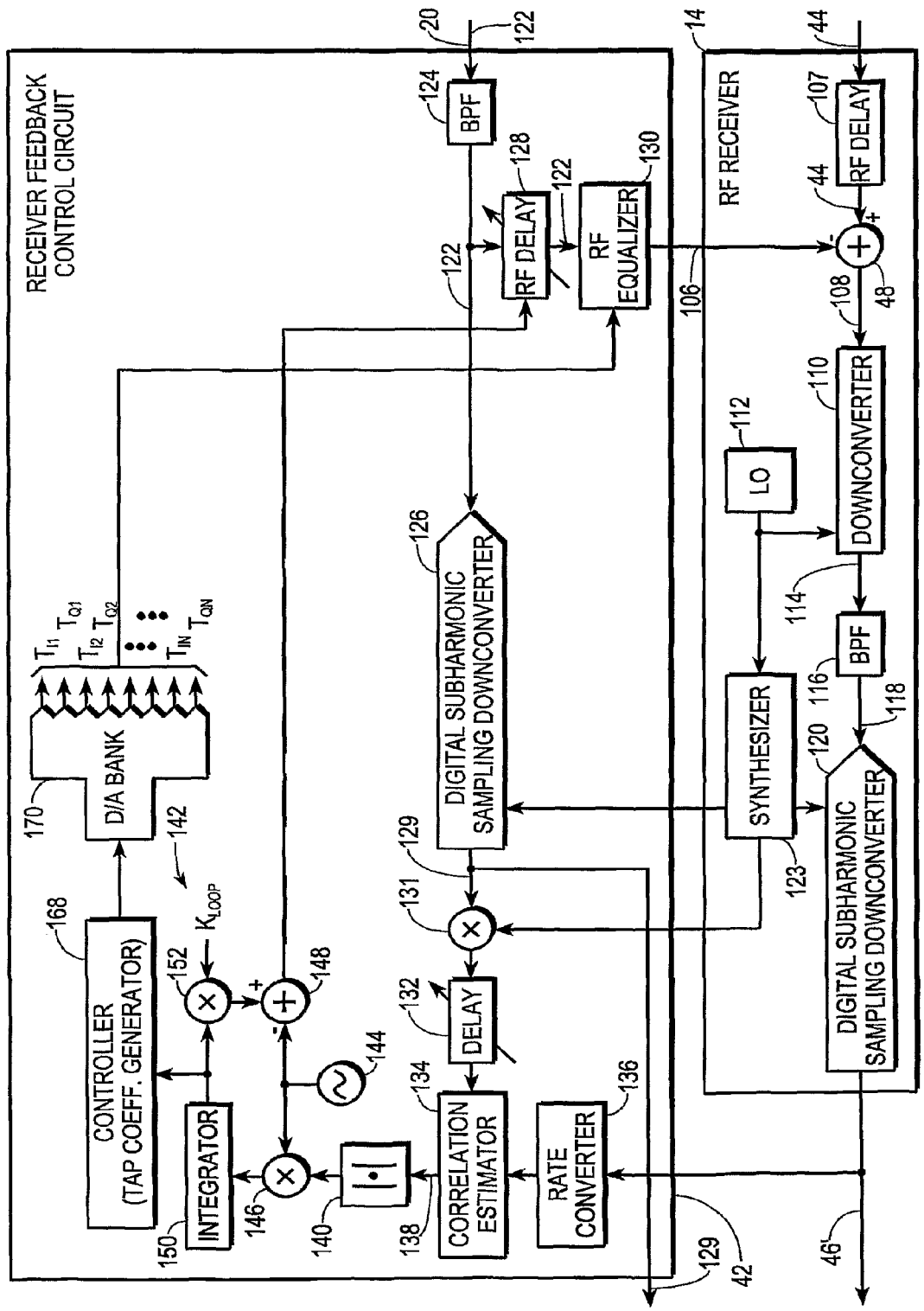
FIG. 10 shows a block diagram of at least a portion of an RF receiver and a receiver feedback control circuit from the RF transceiver of FIGS. 1 and 5.

FIG. 10 shows a block diagram of at least a portion of RF receiver 14 and receiver feedback control circuit 42 from the RF transceiver of FIGS. 1 and 5. RF receiver 14 is adapted to receive RF receive signal 44 from receiver port 45 of duplexer 30 (FIG. 1) or multiport device 30' (FIG. 5). As discussed above, RF receive signal 44 may include $R_x$ and/or $T_x$ leakage components 56 and 58, respectively, along with thermal noise 61 (see FIGS. 3-4 and 6-7). Those skilled in the art will appreciate that various buffer amplifiers and other signal-conditioning circuits conventionally included in RF communication receivers may also be included in RF receiver 14 but may be omitted from the depiction of FIG. 10 to clarify the subject matter relevant to the preferred embodiments discussed herein.

Receiver feedback control circuit 42 generates an RF cancellation signal 106 which passes to an input of analog RF combiner 48 within RF receiver 14. RF receive signal 44 passes through a fixed RF delay element 107 so that RF cancellation signal 106 may be adjustably delayed within receiver feedback control circuit 42 to be temporally aligned with RF receive signal 44. As will be discussed in more detail below, RF cancellation signal 106 is formed from RF transmit signal 20, and temporal alignment is desirably maintained between $R_x$ and/or $T_x$ leakage components 56 and 58 and thermal noise 61 in RF receive signal 44 and RF transmit signal 20 as processed into RF cancellation signal 106.

An output of analog RF combiner 48 produces an RF leakage-compensated receive signal 108 that passes to an input of a downconverter 110. A local oscillator (LO) 112 provides a local oscillator signal to another input of downconverter 110. Downconverter 110 may be implemented in one or two stages to convert RF leakage-compensated receive signal 108 into a downconverted leakage-compensated receive signal 114 which is preferably positioned close to baseband. For an FDD application when receive frequency band 50 is divided into channels 51 (FIGS. 2-4), downconverter 110 may position the one of channels 51 which is the subject of reception as close to baseband as practical. Then, downconverted leakage-compensated receive signal 114 passes to a bandpass filter (BPF) 116. In one embodiment, BPF 116 may be configured to pass only the single channel 51 that is positioned at or near baseband, and to substantially attenuate sidebands and other channels. Thus, BPF 116 may be configured to exhibit a passband more narrow than the passband exhibited by receive isolation filter 28 in duplexer 30 (FIG. 1). In another embodiment, BPF 116 may pass a wideband equivalent to all TDD or FDD channels in which reception may take place for transceiver 10. In either embodiment, BPF 116 reduces the noise that a demodulator located downstream of RF receiver 14 must tolerate.

BPF 116 produces a downconverted, leakage-compensated, receive signal 118 that passes to an input of a digital subharmonic sampling downconverter 120. Downconverter 120 may be implemented in a manner similar to that described above in connection with FIG. 9. An analog-to-digital converter (A/D) within downconverter 120 receives a clock signal from a synthesizer 123, which operates in substantially the same manner as synthesizer 84 from FIG. 9. Desirably, the A/D within downconverter 120 is a high precision A/D, but this A/D need not be operated at an extremely fast conversion rate since it operates at near baseband. Downconverter 120 produces a digitized receive signal stream 46', and digitized receive signal stream 46' is a complex baseband data stream that digitally represents downconverted, leakage-compensated, receive signal 118.

RF transmit signal 20 from duplexer 30 (FIG. 1) or multiport device 30' (FIG. 5) is the source of the $R_x$ and/or $T_x$ leakage components 56 and 58 and of thermal noise 61 in the RF receive signal 44 input at RF receiver 14. A portion of this RF transmit signal 20 is extracted through directional coupler 36 (FIGS. 1 and 5) and routed through splitter 38 (FIGS. 1 and 5) to a control input of receiver feedback control circuit 42. This version of RF transmit signal 20 is also referred to as a raw cancellation signal 122 below.

Raw cancellation signal 122 is first filtered within receiver feedback control circuit 42 through a bandpass filter (BPF) 124. Desirably, BPF 124 exhibits a transfer function approximately equal to the transfer function of receive isolation filter 28 within duplexer 30. In other words, BPF 124 passes receive frequency band 50 and attenuates transmit frequency band 52. Receive signal 44, including $R_x$ and $T_x$ leakage components 56 and 58 and thermal noise 61, pass through receive isolation filter 28 prior to arriving at analog RF combiner 48. With BPF 124 having an approximately equal transfer function, raw cancellation signal 122 after filtering in BPF 124 should include components spectrally close to $R_x$ and $T_x$ leakage components 56 and 58 and to thermal noise 61 in RP receive signal 44. But BPF 124 need not exhibit an exactly equal transfer function to that of receive isolation filter 28. Desirably BPF 124 is formed from much less expensive filter components than receive isolation filter 28 because BPF 124 need not handle the power that is handled by receive isolation filter 28. Any inequality in transfer function will be compensated for in an RF equalizer which is adaptively adjusted in a feedback loop to maximize the achievable cancellation of $R_x$ and/or $T_x$ leakage components 56 and 58 and thermal noise 61. When multiport device 30' (FIG. 5) is used in transceiver 10 rather than duplexer 30 (FIG. 1), BPF 124 is configured to exhibit a passband roughly matched to the multichannel bandwidth.

After processing in BPF 124, raw cancellation signal 122 passes to an input of a digital subharmonic sampling downconverter 126 and to an input of an adjustable RF delay circuit 128. A delayed version of raw cancellation signal 122 output from RF delay circuit 128 passes to an analog RF equalizer 130, where its spectral coloring is altered so that RF cancellation signal 106, which is generated by analog RF equalizer 130, more closely resembles the $R_x$ and/or $T_x$ leakage components 56 and 58 and thermal noise 61 in RF receive signal 44.

Downconverter 126 may also be implemented in a manner similar to that described above in connection with FIG. 9. An analog-to-digital converter (A/D) within downconverter 126 receives a clock signal from synthesizer 123. Since downconverter 126 performs a digital downconversion from RF, the clock supplied thereto from synthesizer 123 exhibits a much greater frequency than the clock supplied to downconverter 120. The output of downconverter 126 is a complex, downconverted, digital, raw, cancellation signal stream 129, and this stream 129 exhibits a greater data rate than digitized receive signal stream 46'. In comparing downconverters 120 and 126, those skilled in the art will appreciate that some care is desirably exercised in selected integers (not shown) used for programming synthesizer 123 to define the clock frequencies supplied to downconverters 120 and 126. Clock frequencies are desirably selected so that digital stream 129 and digitized receive signal stream 46' exhibit as nearly identical baseband frequencies as possible, taking into account that digitized receive signal stream 46' is downconverted from an IF frequency while digital stream 129 downconverted directly from RF.

In one embodiment, digital stream 129 passes from downconverter 126 to an input of a complex multiplication circuit 131, and another input of multiplication circuit 131 receives a clock signal from synthesizer 123. Multiplication circuit 131 performs another downconversion process so that energy from the channel 51 that corresponds to digitized receive signal stream 46' resides at baseband. Multiplication circuit 131 may be omitted when more than a single channel 51 is being simultaneously received.

The baseband digital stream then passes through a variable delay element 132 to a first input of a correlation estimator 134. And, digitized receive signal stream 46' couples to a control input of receiver feedback control circuit 42, where it passes through a rate converter 136 and is provided to a second input of correlation estimator 134. Rate converter 136 steps up the data rate of digitized receive signal stream 46' to match that of raw cancellation signal stream 129. Rate converter 136 may be implemented using an interpolator. Correlation estimator 134 may be implemented as a complex multiplier and may include some averaging or filtering to somewhat smooth a correlation stream 138 it generates. This correlation stream 138 passes through a magnitude circuit 140, which may perform an absolute value, squaring, or similar function, to remove polarity information from correlation stream 138. Correlation stream 138 then passes from magnitude circuit 140 to a delay controller 142.

In one embodiment, delay controller 142 is implemented as a feedback loop that generates a control voltage which establishes the amount of delay inserted into raw cancellation signal 122 by RF delay circuit 128. Digitized receive signal stream 46' represents an error signal that describes the difference between RF receive signal 44 and RF cancellation signal 106, where RF cancellation signal 106 is spectrally close to, and produced in response to, raw cancellation signal 122. In general, correlation between this difference signal and raw cancellation signal 122 should be at a minimum magnitude when RF cancellation signal 106 is temporally aligned with RF receive signal 44 at analog RF combiner 48. So, delay controller 142 is configured to continually, but slowly and minimally, adjust the control voltage which establishes the temporal alignment to maintain as low a correlation as possible.

In particular, a perturbation generator 144 generates a digitized version of a very slowly oscillating and very low amplitude perturbation signal which is applied to an input of a multiplication circuit 146 and an input of a combining circuit 148. The magnitude of correlation stream 138 is applied at another input of multiplication circuit 146. Accordingly, multiplication circuit 146 determines whether the correlation magnitude itself is positively or negatively correlated with the positive and negative excursions of the perturbation signal.

This determination is integrated over a lengthy period in an integrator 150, and the integration result is multiplied by a loop constant ($K_{LOOP}$) in a multiplier 152, then the resulting product is fed back to close the feedback loop for delay controller 142 at combiner 148. The output from combiner 148 passes to a control input of RF delay circuit 128.

The insertion of the perturbation signal has no permanent effect on temporal alignment because it is configured to exhibit a zero mean and the feedback loop of delay controller 142 is integrated over a lengthy period. But the perturbation signal imposes perturbations that continually but incrementally adjust the value held in integrator 150 in the direction that minimizes the magnitude of the correlation determined in correlation estimator 134.

While FIG. 10 presents one preferred form of delay controller 142, those skilled in the art will appreciate that alternate delay controllers 142 may also be devised. One such alternate delay controller 142 may implement an early-late gate structure, as in so-called tau-dither delay tracking loops. These and other alternatives are intended to be included within the scope of this invention.

Figure 11:
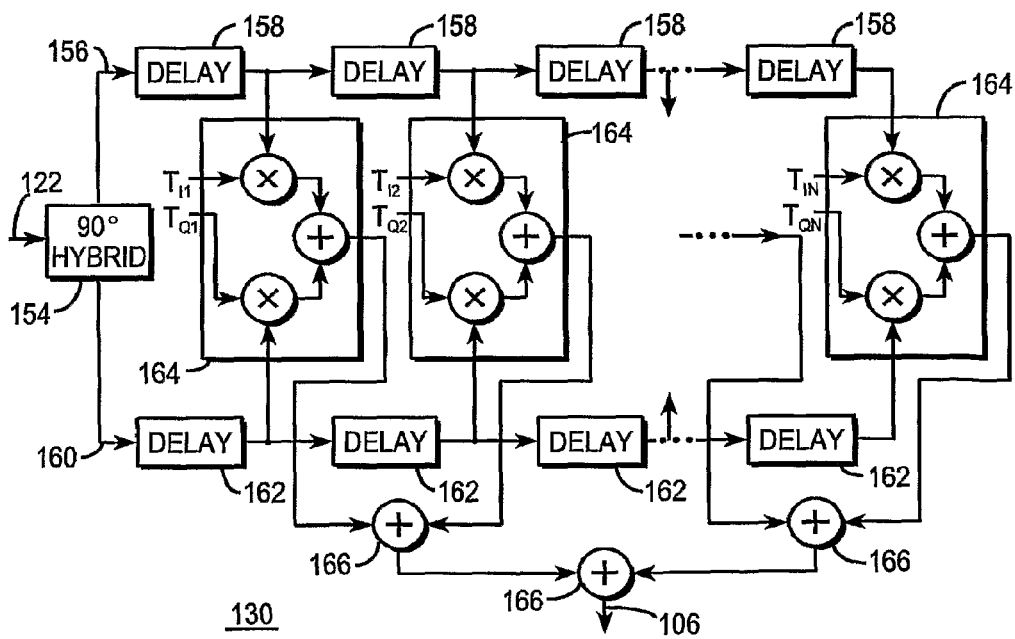
FIG. 11 shows a block diagram of an exemplary RF equalizer which may be used with the RF receiver of FIGS. 1, 5, and 7.

FIG. 11 shows a block diagram of an exemplary analog RF equalizer 130 which may be used in receiver feedback control circuit 42. Analog RF equalizer 130 equalizes raw cancellation signal 122 by applying a transformation function to raw cancellation signal 122. Referring to FIG. 11, the delayed version of raw cancellation signal 122 output from RF delay circuit 128 passes to an input of a quadrature hybrid 154. An in-phase signal 156 produced at hybrid 154 passes through an in-phase tapped delay line 158, and a quadrature-phase signal 160 produced at hybrid 154 passes through a quadrature-phase tapped delay line 162. Respective taps in delay lines 158 and 162 couple to in-phase and quadrature-phase signal inputs of a plurality of vector multipliers 164. Preferably, an odd number of taps are included in each tapped delay line 158 and 162, and the same odd number of vector multipliers 164 is included in analog RF equalizer 130, but this is not a requirement. Outputs of vector multipliers 164 are collected together through one or more combination circuits 166, and a collected output from combination circuits 166 provides RF cancellation signal 106. Each of vector multipliers 164 multiplies its respective delayed version of raw cancellation signal 122 by coefficients ($T_{I1}$, $T_{Q1}$, $T_{I2}$, $T_{Q2}$, ..., $T_{IN}$, $T_{QN}$). Desirably, these coefficients are selected and dynamically adjusted to maximize the amount of cancellation achieved at analog RF combiner 48 (FIG. 10). It is these tap coefficients that define the transformation function applied to raw cancellation signal 122 by analog RF equalizer 130.

Referring back to FIG. 10, a programmable controller or other tap coefficient generator 168 is adapted to obtain the integration results from integrator 150. Controller 168 then performs a tap adjustment process to determine the coefficients ($T_{I1}$, $T_{Q1}$, $T_{I2}$, $T_{Q2}$, ..., $T_{IN}$, $T_{QN}$) used by analog RF equalizer 130. These coefficient values are written to registers associated with a bank 170 of digital-to-analog (D/A) converters, from which analog versions of these coefficient values are routed to respective vector multiplier inputs within analog RF equalizer 130.

Those skilled in the art will appreciate that the above-discussed processing performed by downconverter 126, correlation estimator 134, integrator 150, controller 168, and the like, takes place digitally. Thus, many of the inaccuracies inherent in analog processing are avoided in generating coefficients for RF equalizer 130. As a result, a greater amount of RF cancellation is achieved at combining circuit 48, and the improved digital control allows the cancellation to be applied over wideband transmit and receive signals.

A variety of different tap adjustment processes may be performed by tap coefficient generator 168. One such process may be described as follows. From a steady state condition, tap coefficient generator 168 adjusts each tap's coefficient a small step in each of positive and negative directions. After each adjustment, a sufficient interval of time is provided before making the next adjustment so that the integrated results achieved in integrator 150 have fully responded to the previous adjustment. And, before making a subsequent adjustment, the previously adjusted tap coefficient is returned to its original state. The well integrated result from each adjustment is saved for later evaluation. When each tap's coefficients have been adjusted in each of positive and negative directions, tap coefficient generator 168 then examines the results for all coefficients and selects the single positive or negative tap coefficient adjustment that provided the lowest magnitude correlation value in integrator 150. That tap coefficient is set to reflect its prior adjustment that achieved the most significant reduction in correlation. Then, the process repeats indefinitely with small positive and negative adjustments in all tap coefficients.

In order to arrive at an initial steady state condition from which feedback loops may then be expected to produce desirable results, it may be desirable to perform an initialization process. One such process may be described as follows. Variable digital delay element 132 is first adjusted so that the delay in raw cancellation signal 122 as it propagates from the antenna port 34 of duplexer 30 (FIG. 1) or multiport device 30' (FIG. 5) through downconverter 126 until it reaches its input of correlation estimator 134 matches the propagation delay of $R_x$ and/or $T_x$ leakage components 56 and 58 and of thermal noise 61 as they propagate from the antenna port 34 through downconverter 110 until they reach their input of correlation estimator 134. This temporal alignment process may be accomplished by setting all coefficients in analog RF equalizer 130 to zero, then adjusting variable delay element 132 until a maximum correlation is observed at integrator 150. Then, center tap coefficients for analog RF equalizer 130 may be set to a significant value, holding all other tap coefficients at a zero value for a period of time so that delay controller 142 may arrive at a value that optimally adjusts the delay through RF delay circuit 128, as discussed above. Then a previously used or default set of coefficients, if available, may be preset into analog RF equalizer 130. At this point, initialization is complete and the above-discussed tap adjustment process may be indefinitely repeated to adjust tap coefficients to optimize the cancellation achieved at analog RF combiner 48. But the initialization process may also be repeated from time to time if needed.

Those skilled in the art will appreciate that other forms of tap coefficient generator 168 may also be used. For example, independent feedback loops may be devised to simultaneously perturb each tap coefficient a small amount in alternating directions in correspondence with a perturbation function, where the perturbation function for each loop is orthogonal to the perturbation functions for the other tap coefficients. Then, for each tap coefficient, correlation with the perturbation function and integration may be used to determine the amount and polarity of cancellation change that results from each tap coefficient's perturbations. Such feedback loops may be arranged so that tap coefficients are maintained at values that maximize cancellation. In addition, those skilled in the art will appreciate that a variety of different RF equalizer architectures may be applied and/or combined with the above-discussed architecture to provide RF equalization. For example, a gain-slope equalizer may be cascaded ahead of or otherwise combined with RF equalizer 130.

The cancellation of $R_x$ and/or $T_x$ leakage components 56 and 58 and of thermal noise 61 at analog RF combiner 48 in the manner discussed above helps to isolate receiver 14 from transmitter 12. In many applications, such as in FDD communication systems that use duplexers 30, including even the simple duplexer 30 discussed above in connection with FIG. 4, such cancellation will often be adequate to permit the successful reception of RF receive signal 44. In such cases, digitized receive signal stream 46' may directly serve as modulated digital data stream 46 (FIGS. 1 ad 5). But in other applications, the amount of cancellation achieved at analog RF combiner 48 may not be adequate. Such applications include multichannel TDD communication systems that do not use duplexers but instead use multiport devices 30' which do not include isolation filtering and FDD communication systems with stringent specifications or with poor isolation filtering. In such other applications, after cancellation at analog RF combiner 48 the amount of $R_x$ and/or $T_x$ leakage components 56 and 58 and thermal noise 61 may still be too great for successful reception of RF receive signal 44 when adjacent channels are transmitting. For these situations, additional cancellation processes may be performed in the digital domain to further cancel $R_x$ and/or $T_x$ leakage components 56 and 58 and thermal noise 61.

Figure 12:
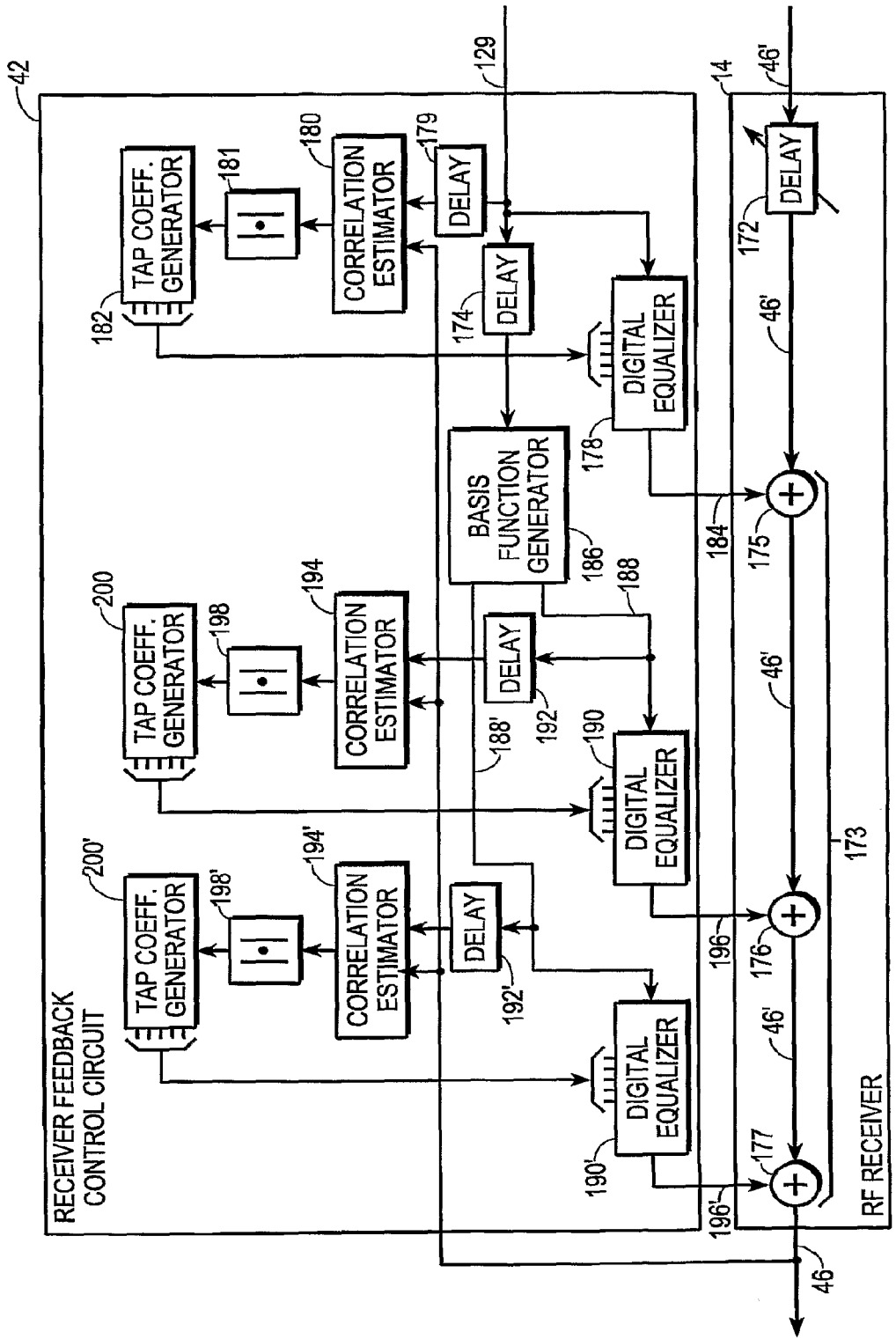
FIG. 12 shows additional blocks useful in the RF receiver and receiver feedback control circuit of the RF transceiver of FIGS. 1 and 5.

FIG. 12 shows additional blocks useful for inclusion in RF receiver 14 and receiver feedback control circuit 42 to provide such additional digital cancellation processes. All blocks depicted in FIG. 12 are implemented digitally using digital signal processing techniques known to those skilled in the art.

Complex digitized receive signal stream 46' passes through a variable delay element 172 to a combining circuit 173, depicted in FIG. 12 as separate combiners 175, 176, and 177. At combining circuit 173, digitized receive signal stream 46' is combined with one or more digitized cancellation signal streams to generate a digitized leakage-compensated receive signal 46, which may serve as the modulated digital data stream output from receiver 14 depicted in FIGS. 1 and 5.

Complex, downconverted, digital, raw, cancellation signal stream 129 passes to a delay element 174, a delay element 179, and a signal input of a digital equalizer 178. Cancellation signal stream 129 is generated as discussed above in connection with sampling downconverter 126 (FIG. 10). But for the purposes of the digital cancellation implemented in accordance with the FIG. 12 block diagram, sampling downconverter 126 desirably uses a high speed, analog-to-digital converter (A/D) that provides as high a resolution as is reasonably practical. In one embodiment, a track-and-hold circuit in combination with a high resolution, high speed A/D provides complex, downconverted, digital, raw, cancellation signal stream 129 in a form that is suitable for digital cancellation.

An output of delay element 179 couples to a first input of a correlation estimator 180. Digitized leakage-compensated receive signal 46 is fed back to a second input of correlation estimator 180. Delay element 179 is configured so that cancellation signal stream 129 experiences a delay through delay element 179 equal to the delay it experiences through digital equalizer 178 and combining circuit 173, causing temporal alignment to be achieved at correlation estimator 180. An output of correlation estimator 180 couples through a magnitude circuit 181 to a tap coefficient generator 182. Tap coefficient generator 182 generates tap coefficients that are supplied to control inputs of digital equalizer 178. A digitized cancellation signal stream 184 output by digital equalizer 178 combines with a delayed version of digitized receive signal stream 46' at combiner 175.

Digital equalizer 178 is desirably implemented using a finite impulse response (FIR) filter structure. Since the implementation is digital, a generous number of taps and a wide dynamic range may be implemented at little expense and at low power consumption, compared to RF equalizer 130 (FIG. 10), discussed above. Thus, digital equalizer 178 is configured to cancel residual portions of $T_x$ and/or $T_x$ leakage components 56 and 58 and thermal noise 61 remaining in digitized receive signal stream 46' after the analog RF cancellation of combining circuit 48.

Equalizer 178 filters cancellation signal stream 129 by applying a transformation function to stream 129 defined by the tap coefficients supplied by tap coefficient generator 182. Since cancellation signal stream 129 is derived from and linearly related to RF transmit signal 20, the digitized cancellation signal stream 184 generated by equalizer 178 is also linearly related to RF transmit signal 20. But it has now been spectrally colored in a way that maximizes the cancellation of $R_x$ and/or $T_x$ leakage components 56 and 58 and thermal noise 61 from digitized receive signal stream 46'.

Correlation estimator 180 and magnitude circuit 181 function similarly to their counterparts 134 and 140, discussed above in connection with FIG. 10. And, although not shown a rate converter may be used to match data rates between digitized leakage-compensated receive signal 46 and cancellation signal stream 129. Tap coefficient generator 182 may generate tap coefficients using any suitable process known to those skilled in the art, including those discussed above in connection with FIG. 10. Desirably, an adaptive process is used so that tap coefficients and the transformation function for digital equalizer 178 that they define are adjusted in response to the degree of cancellation achieved in digitized leakage-compensated receive signal 46. Thus, equalizer 178 is an adaptive equalizer. Delay element 172 is desirably adjusted so that digitized cancellation signal stream 184 is temporally aligned with digitized receive signal stream 46' at combiner 175.

Analog amplification and mixing processes that took place in RF receiver 14 prior to digitization most likely introduced nonlinear spectral components from the signals they processed. The signals processed were a composite of RF receive signal 44, and of $R_x$ and/or $T_x$ leakage components 56 and 58 and thermal noise 61 from RF transmit signal 20. Thus, these analog processes most likely caused digitized receive signal stream 46' to include nonlinear components of $R_x$ and/or $T_x$ leakage components 56 and 58 and thermal noise 61. Subsequent stages of cancellation may be provided to cancel these nonlinear components.

Delay element 174 passes a delayed version of cancellation signal stream 129 to a basis function generator 186. Basis function generator 186 produces higher-order basis functions in response to cancellation signal stream 129. The basis functions are functionally related to cancellation signal stream 129 in a nonlinear way. In one example, one basis function is roughly equal to I*M(I), and another basis function is roughly equal to I*M(I)*M(I), where "I" represents the input signal (e.g., cancellation signal stream 129) and "M(I)" represents the magnitude of the input signal. Thus, they are not linearly related but are nonlinearly related to RF transmit signal 20. The precise functional relationship is not a critical parameter in the preferred embodiment. But desirably, the basis functions are as orthogonal to each other as is reasonably possible. FIG. 12 depicts the generation of two basis functions 188 and 188' functionally related to cancellation signal stream 129, and also to RF transmit signal 20, squared and cubed, respectively. Any number of basis functions may be generated, but diminishing returns and higher data rates result as the order of relationship to RF transmit signal 20 increases.

Basis function 188 is supplied to a signal input of a digital equalizer 190 and through a delay element 192 to a first input of a correlation estimator 194. An output of digital equalizer 190 provides a nonlinear digitized cancellation signal stream 196 that is nonlinearly related to RF transmit signal 20 and is combined with digitized receive signal stream 46' at combiner 176. Digitized leakage-compensated receive signal 46 is fed back to a second input of correlation estimator 194. Delay element 192 is configured so that basis function 188 experiences a delay through delay element 192 equal to the delay it experiences through digital equalizer 190 and combining circuit 173, causing temporal alignment to be achieved at correlation estimator 194. An output of correlation estimator 194 couples through a magnitude circuit 198 to a tap coefficient generator 200. Tap coefficient generator 200 generates tap coefficients that are supplied to control inputs of digital equalizer 190.

The stage that processes basis function 188' operates in a similar matter. Thus, basis function 188' is supplied to a signal input of a digital equalizer 190' and through a delay element 192' to a first input of a correlation estimator 194'. An output of digital equalizer 190' provides a nonlinear digitized cancellation signal stream 196' that is nonlinearly related to RF transmit signal 20 and is combined with digitized receive signal stream 46' at combiner 177. Digitized leakage-compensated receive signal 46 is fed back to a second input of correlation estimator 194'. Delay element 192' is configured so that basis function 188' experiences a delay through delay element 192' equal to the delay it experiences through digital equalizer 190' and combining circuit 173, causing temporal alignment to be achieved at correlation estimator 194'. An output of correlation estimator 194' couples through a magnitude circuit 198' to a tap coefficient generator 200'. Tap coefficient generator 200' generates tap coefficients that are supplied to control inputs of digital equalizer 190'.

Like digital equalizer 178, digital equalizers 190 and 190' are desirably implemented using a finite impulse response (FIR) filter structure. But fewer taps are contemplated for use than in digital equalizer 178. Thus, delay element 174 is configured to achieve temporal alignment with digitized receive signal stream 46' at combiners 176 and 177.

Digital equalizers 190 and 190' are configured to cancel nonlinear intermodulation and harmonic products introduced by processing $R_x$ and/or $T_x$ leakage components 56 and 58 and thermal noise 61 through analog amplifier and mixer components in the front-end stages of RF receiver 14. Each of equalizers 190 and 190' applies its own transformation function its own basis function 188 and 188', and those transformation functions are defined by the tap coefficients supplied by the respective tap coefficient generators 200 and 200'. Since basis functions 188 and 188' are each derived from but nonlinearly related to RF transmit signal 20, the nonlinear digitized cancellation signal streams 196 and 196' generated by equalizers 190 and 190' are also nonlinearly related to RF transmit signal 20, just spectrally colored in a way that maximizes the cancellation of intermodulation products from $R_x$ and/or $T_x$ leakage components 56 and 58 and thermal noise 61 from digitized receive signal stream 46'.

Those skilled in the art will appreciate that basis functions 188 and 188' may occupy wider bandwidths than cancellation signal stream 129 due to their nonlinear relationships to cancellation signal stream 129. Thus, data rates may be stepped up using faster clock rates and rate converters (not shown) as appropriate. But, after being fed back to correlation estimators 194 and 194', the data rate of digitized leakage-compensated receive signal 46 may be decimated back to a level consistent with RF receive signal 44.

Those skilled in the art will also appreciate that digitized leakage-compensated receive signal stream 46 may alternatively drive rate converter 136 and correlation estimator 138 (FIG. 10) as taught in FIG. 12, and that digitized receive signal stream 46' may alternatively drive correlation estimators 180, 194, and 194' (FIG. 12) as taught in FIG. 10.

In some transceiver applications, a strong narrowband interfering signal may be present near receive frequency band 50. In such applications, an additional feature of transceiver 10 may be desirable to reduce cross modulation products to a manageable level. In particular, transceiver 10 as described herein is likely to operate with an unusually high amount of transmit frequency band 52 energy present at the front end of RF receiver 14. RF receiver 14 will include analog components, such as amplifiers and mixers, that are somewhat nonlinear, even though such components are desirably as linear as practical. To the extent that nonlinear processing takes place in such components, cross modulation will occur between the unusually high amount of transmit frequency band 52 energy and other signals, such as a strong narrowband interfering signal. As a result, unwanted, and undesirably strong, intermodulation products may appear in the receive band. But the interfering signal may also be cancelled so that such intermodulation products are reduced to a manageable level.

Figure 13:
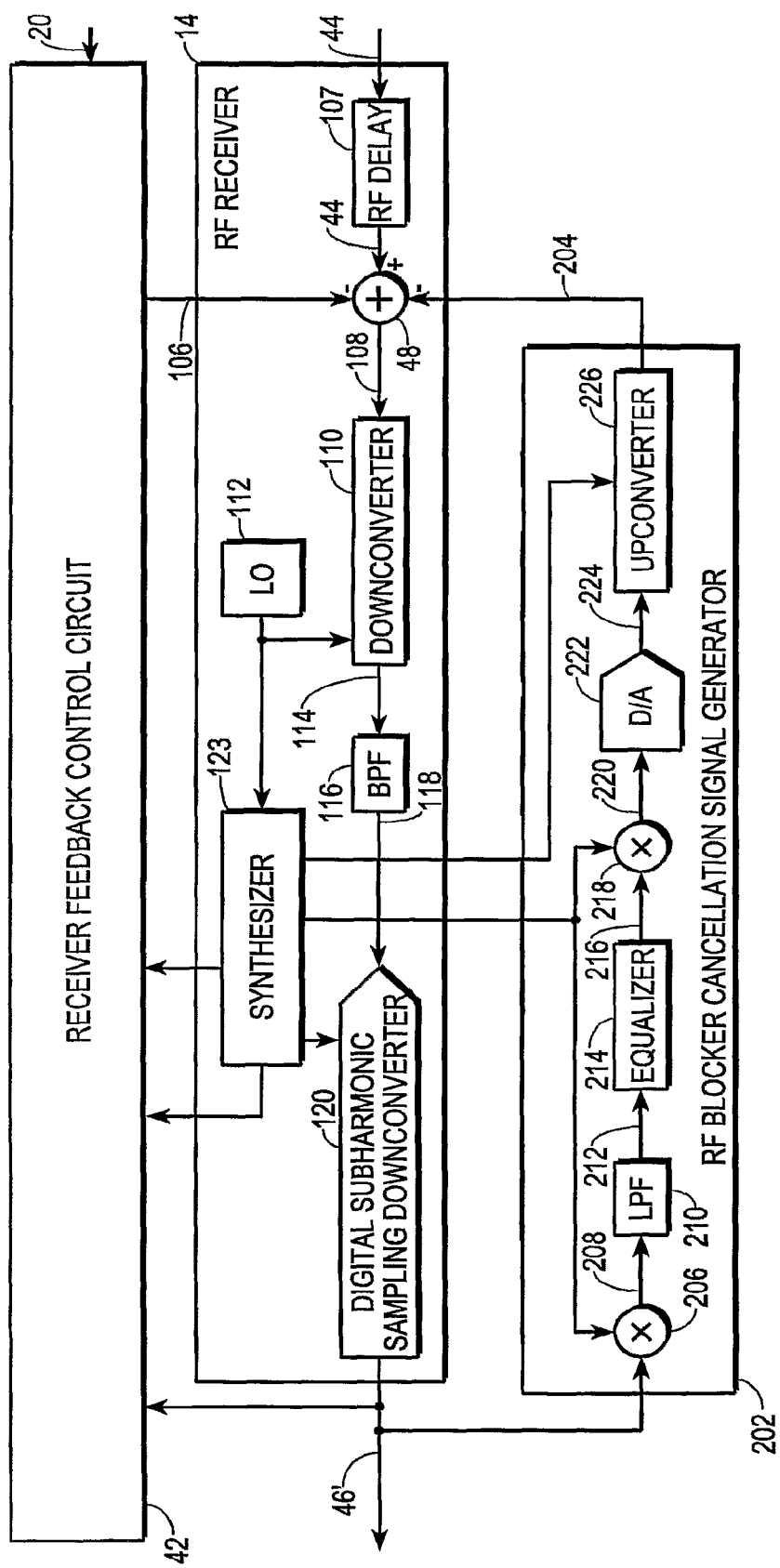
FIG. 13 shows a block diagram of the RF receiver and receiver feedback control circuit of FIG. 10 in combination with an RF blocker cancellation signal generator.

FIG. 13 shows a block diagram of RF receiver 14, and receiver feedback control circuit 42, as discussed above in connection with FIG. 10, in combination with an RF blocker cancellation signal generator 202. RF blocker cancellation signal generator 202 provides for the cancellation of a narrowband interfering signal, hereinafter referred to as a blocker, which may reside near receive frequency band 50. In particular, digitized receive signal stream 46' serves as an input to RF blocker cancellation signal generator 202, and RF blocker cancellation signal generator 202 generates an RE blocker cancellation signal 204, which is fed to analog RF combiner 48. Thus in the FIG. 13 embodiment of transceiver 10, analog RF combiner 48 generates RF leakage-compensated receive signal 108 by combining RF cancellation signal 106, RF receive signal 44, and RF blocker cancellation signal 204.

RF blocker cancellation signal generator 202 includes a mixer 206 which downconverts digitized receive signal stream 46'. As discussed above, digitized receive signal stream 46' is a complex digital signal which is spectrally positioned at baseband from the perspective of RF receive band 50. Thus, mixer 206 is desirably configured as a complex digital mixer. Moreover, mixer 206 is configured to produce a frequency-shifted signal 208 in which a portion of the spectrum outside of RF receive band 50, such as where a blocker may reside, is shifted to baseband (e.g., near 0 Hz). This may be accomplished by providing a clock signal of a suitable frequency from synthesizer 123 to mixer 206.

Frequency-shifted signal 208 is a complex signal that drives a low pass filter 210, which in turn generates a digital baseband blocker signal 212 by attenuating spectrum greater than the blocker's baseband. Digital baseband blocker signal 212 drives an equalizer 214. Equalizer 214 is a complex, digital equalizer that equalizes blocker signal 212 to generate a digital baseband blocker cancellation signal 216 which is more suitable for use in canceling the blocker from RF receive signal 44. Equalizer 214 may use techniques similar to those discussed above in connection with digital equalizers 178, 190, and 190' (FIG. 12) to adapt tap coefficients so as to maintain as optimum a blocker cancellation operation as practical.

Digital baseband blocker cancellation signal 216 drives a complex digital mixer circuit 218. Desirably, mixer circuit 218 spectrally shifts blocker cancellation signal 216 in frequency from baseband to the same frequency it occupied within digitized receive signal stream 46'. Thus, substantially the same clock signal that was supplied from synthesizer 123 to mixer 206 may also be supplied to mixer 218. Mixer 218 produces a complex, digital, IF blocker signal 220. A digital-to-analog (D/A) conversion section 222 transforms complex, digital, IF blocker signal 220 into a complex, analog, IF blocker signal 224. And, an upconverter 226 upconverts IF blocker signal 224 into RF blocker cancellation signal 204. Upconverter 226 desirably upconverts IF blocker signal 224 to exhibit the same RF frequency that the blocker exhibits within RF receive signal 44. The oscillation signal for this upconversion may be provided by another output from synthesizer 123. As discussed above, RF blocker cancellation signal 204 is combined with RF cancellation signal 106 and RF receive signal 44 in analog RF combiner 48 to generate RF leakage-compensated receive signal 108. But any narrow-band blocker is at least partially cancelled, and any cross modulation that may take place between transmit frequency band 50 energy and the at least partially cancelled narrow-band blocker produces intermodulation products at a manageable level within receive frequency band 50.

In summary, the present invention provides an improved transceiver with compensation for transmit signal leakage into a receive signal and a method therefor. In at least one embodiment of the present invention, a transceiver configured in accordance with the teaching of the present invention may use a relatively simple and inexpensive duplexer to isolate the receiver portion of the transceiver from the transmitter portion. In accordance with at least one embodiment, portions of a transmit signal that isolation filters leak into a receive signal are cancelled from the receive signal. In accordance with at least one embodiment, the transceiver and method are self-calibrating so that they adapt to different duplexer characteristics and to changes in duplexer characteristics over time and temperature. In accordance with at least one embodiment, the transceiver and corresponding method compensate for isolation filter leakage over a wide receive frequency band. In accordance with at least one embodiment, a duplexer may be omitted from the transceiver altogether. In accordance with at least one embodiment, transmit signal leakage is cancelled from a receive signal using both analog and digital processing. In accordance with at least one embodiment, the transceiver and method of the present invention control the processing of a reference cancellation signal digitally to avoid the inaccuracies of analog processing and to improve cancellation.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that isolation filters need not be included in a duplexer as described herein but may be associated with separate nearby antennas. Those skilled in the art will also appreciate that a duplexer may be provided that includes a directional coupler located within the duplexer. Such a directional coupler may be located between the output of the transmit isolation filter and antenna port of the duplexer. And, those skilled in the art will appreciate that devices other than the directional coupler described herein, such as a circulator, may be used in lieu of or in addition to the directional coupler to achieve isolation between RF transmit and RF receive signals propagating in opposite directions over a common transmission line. Moreover, those skilled in the art will appreciate that the present invention may also be used with beneficial results in both wireless applications as discussed herein and in wired applications, such as in connection with cable and optical communication systems. These and other modifications and adaptations which are obvious to those skilled in the art are to be included within the scope of the present invention.

What is claimed is:

1. A method of operating an RF transceiver to compensate for leakage of an RF transmit signal into an RF receive signal, said method comprising:
   obtaining a forward communication signal in a transmitter portion of said transreceiver;
   upconverting said forward communication signal to generate said RF transmit signal;
   deriving a first cancellation signal, which is at RF, is derived from said RF transmit signal, and exhibits spectral components which overlap at least a portion of said RF receive signal;
   combining said first cancellation signal at RF with said RF receive signal to cancel a first portion of said leakage of said RF transmit signal into said RF receive signal and to form a first leakage-compensated receive signal, which is at RF;
   forming a second cancellation signal which is a digitized data stream, is at baseband, is derived from said forward communication signal, and is nonlinearly related to said RF transmit signal;
   downconverting and digitizing said first leakage-compensated receive signal to form a downconverted and digitized receive signal stream; and
   combining said second cancellation signal and said downconverted and digitized receive signal stream to cancel a second portion of said leakage of said RF transmit signal into said RF receive signal and to form a second leakage-compensated receive signal, which is a digitized data stream and is at baseband frequency.

2. A method as claimed in claim 1 wherein said deriving activity comprises:
   applying a transformation function to said RF transmit signal to generate said first cancellation signal; and
   adjusting said transformation function.

3. A method as claimed in claim 2 wherein said applying activity is performed in an RF equalizer.

4. A method as claimed in claim 2 wherein:
   said forming step additionally comprises downconverting said RF transmit signal to generate a downconverted version of said transmit signal; and
   said adjusting activity adjusts said transformation function in response to correlation between said downconverted and digitized receive signal stream and said downconverted version of said transmit signal.

5. A method as claimed in claim 4 wherein said downconverting step which generates said downconverted version of said transmit signal downconverts said RF transmit signal using a direct downconversion through subharmonic sampling.

6. A method as claimed in claim 1 wherein said forming activity comprises:
   generating a basis function that is nonlinearly related to said RF transmit signal;
   applying a transformation function to said basis function to produce said second cancellation signal; and
   adjusting said transformation function in response to one of said downconverted and digitized receive signal stream and said second leakage-compensated receive signal.

7. A method as claimed in claim 1 wherein:
said method additionally comprises forming a third cancellation signal which is a digitized data stream, is at baseband, is derived from said forward communication signal, and is linearly related to said RF transmit signal; and
said combining activity combines said third cancellation signal with said second cancellation signal and said downconverted and digitized receive signal stream to cancel a third portion of said leakage of said RF transmit signal into said RF receive signal.

8. A method as claimed in claim 6 wherein:
said basis function is functionally related to said RF transmit signal squared.

9. A method as claimed in claim 1 additionally comprising implementing a feedback loop to maintain temporal alignment between said first cancellation signal and said RF receive signal during said combining activity.

10. A method as claimed in claim 1 wherein:
said method additionally comprises generating a third cancellation signal, which is at RF, in response to said first leakage-compensated receive signal; and
said combining step which forms said first leakage-compensated receive signal additionally combines said third cancellation signal with said first cancellation signal and said RF receive signal to form said first leakage-compensated receive signal.

11. A method as claimed in claim 10 wherein said RF receive signal spectrally resides in a receive signal band, and said third-cancellation-signal generating activity comprises:
further downconverting said downconverted and digitized receive signal stream to produce a frequency-shifted signal in which a portion of spectrum outside of said receive signal band is shifted to a baseband;
attenuating spectrum greater than said baseband in said frequency-shifted signal to produce a blocker signal;
equalizing and upconverting said blocker signal to produce said third cancellation signal.

12. A method as claimed in claim 1 wherein said second compensation signal is also derived from said RF transmit signal.

13. A method as claimed in claim 6 wherein said basis function is functionally related to said RF transmit signal cubed.

14. An RF transceiver in which leakage of an RF transmit signal into an RF receive signal is compensated for, said RF communications transceiver comprising:
an upconversion section of a transmitter portion of said transceiver configured to translate a forward communication signal into said RF transmit signal;
an analog RF equalizer having an input adapted to obtain said RF transmit signal and having an output which provides a first cancellation signal which is at RF, is derived from said RF transmit signal, and exhibits spectral components which overlap at least a portion of said RF receive signal;
an analog RF combiner which cancels a first portion of said leakage of said RF transmit signal into said RF receive signal, said analog RF combiner having a first input adapted to receive said RF receive signal, a second input adapted to receive said first cancellation signal and an output which provides a first leakage-compensated receive signal, which is at RF;
a digital equalizer configured to provide a second cancellation signal, wherein said second cancellation signal is nonlinearly related to said RF transmit signal, is a digitized data stream, is at baseband, and is derived from said forward communication signal;
a digital downconverter configured to downconvert and digitize said first leakage-compensated receive signal to form a downconverted and digitized receive signal stream; and
a digital combining circuit which cancels a second portion of said leakage of said RF transmit signal into said RF receive signal, said digital combining circuit having a first input adapted to receive said downconverted and digitized receive signal stream, a second input adapted to receive said second cancellation signal, and an output adapted to form a second leakage-compensated receive signal, which is a digitized data stream and is at baseband frequency.

15. A transceiver as claimed in claim 14 wherein:
said transceiver additionally comprises a basis function generator configured to generate to basis function that is nonlinearly related to said RF transmit signal; and
said digital equalizer is responsive to said basis function and adjusts in response to one of said downconverted and digitized receive signal stream and said second leakage-compensated receive signal.

16. A transceiver as claimed in claim 15 wherein said basis function is functionally related to said RF transmit signal squared.

17. A transceiver as claimed in claim 15 wherein said basis function is functionally related to said RF transmit signal cubed.

18. A transceiver as claimed in claim 14 wherein:
said digital equalizer is a first digital equalizer;
said transceiver additionally comprises a second digital equalizer configured to provide a third cancellation signal, wherein said third cancellation signal is linearly related to said RF transmit signal, is a digitized data stream, is at baseband, and is derived from said forward communication signal; and
said digital combining circuit has a third input adapted to receive said third cancellation signal.

19. A transceiver as claimed in claim 14 wherein said second compensation signal is also derived from said RF transmit signal.

20. A method of operating an RF transceiver to compensate for leakage of an RF transmit signal into an RF receive signal, said method comprising:
upconverting a forward communication signal in a transmitter portion of said transceiver to generate said RF transmit signal;
extracting a portion of said RF transmit signal to form an extracted version of said transmit signal;
applying a transformation function in an adaptive RF equalizer controlled by tap coefficients, to said extracted version of said transmit signal to generate a cancellation signal, which is at RF and exhibits spectral components which overlap at least a portion of said RF receive signal;
combining said cancellation signal at RF with said RF receive signal to cancel a portion of said leakage of said RF transmit signal into said RF receive signal and to form a leakage-compensated receive signal, which is at RF;
downconverted and digitizing said extracted version of said RF transmit signal to produce a baseband downconverted digitized version of said RF transmit signal;
digitizing said leakage-compensated receive signal to produce a digitized receive signal stream; and adjusting said tap coefficients of said adaptive RF equalizer in response to said baseband downconverted digitized version of said RF transmit signal and said digitized receive signal stream.

21. A method as claimed in claim 20 wherein said digitizing activity that produces said digital version of said transmit signal additionally downconverts said extracted version of said transmit signal by performing a direct downconversion through subharmonic sampling.

22. A method as claimed in claim 20 wherein:
said cancellation signal is a first cancellation signal;
said method additionally comprises forming a second cancellation signal which is a digitized data stream, is at a baseband, is derived from said forward communication signal, and is nonlinearly related to said RF transmit signal; and
combining said second cancellation signal and said digitized receive signal stream to cancel a second portion of said leakage of said RF transmit signal into said RF receive signal and to form a second leakage-compensated receive signal, which is a digitized data stream and is at baseband frequency.

23. A method as claimed in claim 22 wherein:
said method additionally comprises forming a third cancellation signal which is a digitized data stream, is at baseband, is derived from said forward communication signal, and is linearly related to said RF transmit signal; and
said second cancellation signal combining activity combines said third cancellation signal with said second cancellation signal and said downconverted and digitized receive signal stream to cancel a third portion of said leakage of said RF transmit signal into said RF receive signal.

* * * * *

UNITED STATES PATENT AND TRADEMARK OFFICE
CERTIFICATE OF CORRECTION

PATENT NO. : 8,805,298 B2
APPLICATION NO. : 12/521412
DATED : August 12, 2014
INVENTOR(S) : Ronald Duane McCallister Page 1 of 1

It is certified that error appears in the above-identified patent and that said Letters Patent is hereby corrected as shown below:

On the Title Page, item (45),

At the top of page 1 following "Date of Patent:" please replace "Aug. 12, 2014" with --*Aug. 12, 2014--.

Signed and Sealed this
Eighteenth Day of November, 2014

Michelle K. Lee
*Deputy Director of the United States Patent and Trademark Office*